(12) United States Patent
Tomigashi

(10) Patent No.: US 7,898,197 B2
(45) Date of Patent: Mar. 1, 2011

(54) MOTOR CONTROL DEVICE

(75) Inventor: Yoshio Tomigashi, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 306 days.

(21) Appl. No.: 12/178,983

(22) Filed: Jul. 24, 2008

(65) Prior Publication Data

US 2009/0026988 A1    Jan. 29, 2009

(30) Foreign Application Priority Data

Jul. 27, 2007  (JP) ................ 2007-195544

(51) Int. Cl.
*H02P 21/14* (2006.01)
(52) U.S. Cl. ............ 318/400.02; 318/801; 318/802; 318/805; 318/807; 318/811
(58) Field of Classification Search ........... 318/400.02, 318/254, 432, 801, 802, 807, 811, 727
See application file for complete search history.

(56) References Cited

U.S. PATENT DOCUMENTS

| | | | | |
|---|---|---|---|---|
| 5,170,116 A * | 12/1992 | Bavard et al. | ............ | 324/772 |
| 5,481,168 A * | 1/1996 | Mutoh et al. | ............ | 318/432 |
| 5,650,700 A * | 7/1997 | Mutoh et al. | ............ | 318/432 |
| 5,998,958 A * | 12/1999 | Lee | ............ | 318/801 |
| 6,184,638 B1 * | 2/2001 | Kinpara | ............ | 318/432 |
| 6,275,000 B1 * | 8/2001 | Nishimura | ............ | 318/811 |
| 6,315,081 B1 * | 11/2001 | Yeo | ............ | 187/290 |
| 6,577,096 B2 * | 6/2003 | Cho | ............ | 318/727 |
| 6,598,008 B2 * | 7/2003 | Lee | ............ | 702/147 |
| 7,348,749 B2 * | 3/2008 | Ide et al. | ............ | 318/599 |

| | | | | |
|---|---|---|---|---|
| 2002/0041171 A1 * | 4/2002 | Cho | ............ | 318/727 |
| 2003/0009309 A1 * | 1/2003 | Lee | ............ | 702/147 |
| 2004/0036441 A1 * | 2/2004 | Inazumi | ............ | 318/807 |

(Continued)

FOREIGN PATENT DOCUMENTS

CN    1481604 A    3/2004

(Continued)

OTHER PUBLICATIONS

Yukinori Inoue et al., "Torque ripple reduction, and flux-weakening control for interior permanent magnet synchronous motor based on direct torque control".

(Continued)

*Primary Examiner*—Paul Ip
(74) *Attorney, Agent, or Firm*—NDQ&M Watchstone LLP

(57) ABSTRACT

A motor control device includes a motor current detector for detecting motor current flowing in a three-phase motor based on current flowing between an inverter driving the motor and a DC power supply, a specified voltage vector generating portion for generating a specified voltage vector indicating a voltage vector to which an applied voltage to the motor should follow based on a magnetic flux linkage of an armature winding of the motor, a specified voltage vector correcting portion for correcting the generated specified voltage vector, and a magnetic flux estimating portion for estimating the magnetic flux linkage based on the motor current and the specified voltage vector after the correction. The motor control device controls the motor via the inverter in accordance with the specified voltage vector after the correction.

9 Claims, 19 Drawing Sheets

U.S. PATENT DOCUMENTS

| | | | |
|---|---|---|---|
| 2004/0189243 A1 | 9/2004 | Tobari et al. | |
| 2005/0146306 A1* | 7/2005 | Ha et al. | 318/807 |
| 2007/0069682 A1* | 3/2007 | Ide et al. | 318/719 |
| 2008/0007198 A1* | 1/2008 | Kinpara et al. | 318/807 |
| 2008/0297097 A1* | 12/2008 | Lee et al. | 318/701 |
| 2009/0237027 A1* | 9/2009 | Inazumi | 318/802 |
| 2010/0079104 A1* | 4/2010 | Becker et al. | 318/802 |

FOREIGN PATENT DOCUMENTS

| | | |
|---|---|---|
| JP | 02-197295 | 8/1990 |
| JP | 2003-189670 | 7/2003 |
| JP | 2005-269768 A | 9/2005 |
| JP | 2006-238637 A | 9/2006 |

OTHER PUBLICATIONS

Institute of Electrical Engineers, National Conference Lecture Papers, Mar. 2006, fourth volume, 4-106, p. 166-167.

Office Action issued on Jun. 1, 2010 for a corresponding Chinese Application No. 200810144302.0.

\* cited by examiner

T0-T1

T1-T2

T2-T3

T3-T4

DETECTED PHASE CURRENT

|  | T1 | T2 | T3 | MODE | T1-T2 | T2-T3 |
|---|---|---|---|---|---|---|
| $v_u > v_v > v_w$ | CntW | CntV | CntU | 1 | -w | u |
| $v_v > v_u > v_w$ | CntW | CntU | CntV | 2 | -w | v |
| $v_v > v_w > v_u$ | CntU | CntW | CntV | 3 | -u | v |
| $v_w > v_v > v_u$ | CntU | CntV | CntW | 4 | -u | w |
| $v_w > v_u > v_v$ | CntV | CntU | CntW | 5 | -v | w |
| $v_u > v_w > v_v$ | CntV | CntW | CntU | 6 | -v | u |

SAMPLING TIMING
ST1:T1-T2
ST2:T2-T3

BEFORE CORRECTION

AFTER CORRECTION

BEFORE CORRECTION

AFTER CORRECTION

MOTOR CONTROL DEVICE

This nonprovisional application claims priority under 35 U.S.C. §119(a) on Patent Application No. 2007-195544 filed in Japan on Jul. 27, 2007, the entire contents of which are hereby incorporated by reference.

BACKGROUND OF THE INVENTION

1. Field of the Invention

The present invention relates to a motor control device for driving and controlling a motor.

2. Description of Related Art

In order to control a motor by supplying three-phase AC power to the motor, it is necessary to detect current values of two phases (e.g., U-phase current and V-phase current) among three phases including U-phase, V-phase and W-phase. Although two current sensors (current transformers or the like) are usually used for detecting current values of two phases, the use of two current sensors causes an increase of cost of the entire system equipped with the motor.

For this reason, there is proposed a conventional method in which bus current (DC current) between an inverter and a DC power supply is sensed by a single current sensor, and current values of two phases are detected from the sensed bus current. This method is also called a single shunt current detecting method.

FIG. 23 shows a general block diagram of a conventional motor driving system in which the single shunt current detecting method is adopted. An inverter (PWM inverter) 202 is equipped with half bridge circuits for three phases, each of which includes an upper arm and a lower arm, and it converts a DC voltage from a DC power supply 204 into a three-phase AC voltage by switching the individual arms in accordance with specified three-phase voltage values given by a controller 203. The three-phase AC voltage is supplied to a three-phase permanent magnet synchronous motor 201, so that the motor 201 is driven and controlled.

A line connecting the individual lower arms in the inverter 202 with the DC power supply 204 is called a bus line 213. A current sensor 205 transmits a signal indicating bus current that flows in the bus line 213 to the controller 203. The controller 203 does sampling of an output signal of the current sensor 205 at appropriate timing so as to detect phase current of a phase in which a voltage level becomes a maximum value (maximum phase) and phase current of a phase in which a voltage level becomes a minimum value (minimum phase), i.e., current values of two phases.

If voltage levels between different phase voltages are separated from each other sufficiently, current values of two phases can be detected from the output signal of the current sensor 205. However, if the maximum phase and an intermediate phase of voltage become close to each other, or if the minimum phase and the intermediate phase of voltage become close to each other, it is difficult to detect current values of two phases (note that description of the single shunt current detecting method including description of a reason why it becomes difficult to detect current values of two phases will also appear later with reference to FIG. 4 and the like).

Therefore, there is proposed a method in which if current values of two phases cannot be detected by the single shunt current detecting method in a certain period, a pulse width of a PWM signal for each arm in the inverter is corrected based on gate signals of three phases in the period.

A usual correction example of a specified voltage value (pulse width) that also supports the above-mentioned correction is shown in FIG. 24. In FIG. 24, the horizontal axis indicates time while 220u, 220v and 220w indicate voltage levels of the U-phase, the V-phase and the W-phase, respectively. Since a voltage level of each phase follows the specified voltage value (pulse widths) for each phase, they are considered to be equivalent. As shown in FIG. 24, the specified voltage value (pulse width) of each phase is corrected so that "maximum phase and intermediate phase" as well as "minimum phase and intermediate phase" of the voltage do not approach each other closer than a predetermined distance. Thus, voltages of individual phases do not become close to each other to the extent that current values of two phases cannot be detected, and current values of two phases can be detected stably.

When this type of voltage correction is performed, it is necessary to determine a correction quantity based on a relationship among specified voltage values (pulse widths) of three phases. If an applied voltage is low, in particular, the correction may be required for each of the three phases resulting in a complicated correction process.

On the other hand, a direct torque control is proposed as the control method that enables to reduce a torque ripple more than the case of performing a vector control. FIG. 25 illustrates a block diagram of a general structure of the conventional motor driving system that realizes the direct torque control.

In the motor driving system shown in FIG. 25, an α-axis component $\phi_\alpha$ and a β-axis component $\phi_\beta$ of a magnetic flux linkage of an armature winding of the motor are estimated based on two-phase current values ($i_\alpha$ and $i_\beta$) obtained from two current sensors and two-phase voltage values ($v_\alpha$ and $v_\beta$) obtained from two voltage detectors, and a generated torque T of the motor is estimated. In addition, a phase $\theta_S$ of the magnetic flux linkage vector viewed from the α-axis is calculated. These values are calculated in accordance with the equations (A-1) to (A-4) below. Here, $R_a$ represents a resistance value of a one phase of the armature winding, $P_N$ represents the number of pole pairs of the motor, and "$\phi_{\alpha|t=0}$" and "$\phi_{\beta|t=0}$" represent values of the $\phi_\alpha$ and $\phi_\beta$ at time t=0 (i.e., initial values of $\phi_\alpha$ and $\phi_\beta$), respectively.

$$\phi_\alpha = \int (v_\alpha - R_a i_\alpha) dt + \phi_{\alpha|t=0} \tag{A-1}$$

$$\phi_\beta = \int (v_\beta - R_a i_\beta) dt + \phi_{\beta|t=0} \tag{A-2}$$

$$\theta_S = \tan^{-1}(\phi_\beta/\phi_\alpha) \tag{A-3}$$

$$T = P_N(\phi_\alpha i_\beta - \phi_\beta i_\alpha) \tag{A-4}$$

Then, target values $\phi_\alpha^*$ and $\phi_\beta^*$ of $\phi_\alpha$ and $\phi_\beta$ are calculated based on a torque error ΔT(i.e., T*−T) between the estimated torque T and a specified torque value T*, a phase $\theta_S$, and a target value $|\phi_S^*|$ of a magnitude of the magnetic flux linkage vector made up of $\phi_\alpha$ and $\phi_\beta$ (i.e., amplitude of the magnetic flux linkage), and magnetic flux control is performed so that $\phi_\alpha$ and $\phi_\beta$ follow $\phi_\alpha^*$ and $\phi_\beta^*$. More specifically, the target values ($v_\alpha^*$ and $v_\beta^*$) of the two-phase voltage values ($v_\alpha$ and $v_\beta$) are calculated so that $\phi_\alpha$ and $\phi_\beta$ follow $\phi_\alpha^*$ and $\phi_\beta^*$, and the specified three-phase voltage values ($v_u^*$, $v_v^*$ and $v_w^*$) are generated from the target values of the two-phase voltage and are supplied to the inverter.

In the direct torque control, voltage and current to be used for estimating the magnetic flux are usually detected (sensed) by a detector (sensor). It is possible to calculate the voltage to be used for estimating the magnetic flux by using the specified voltage value. However, when trying to use the single shunt current detecting method for the direct torque control, it is necessary to correct the specified voltage value. Unless this is taken into account for making up the control system, the estimated magnetic flux will have an error.

The same is true on the case where the single shunt current detecting method is used for the motor control device performing estimation of the magnetic flux as well as the case where the single shunt current detecting method is used for the direct torque control.

SUMMARY OF THE INVENTION

A motor control device according to an embodiment of the present invention includes a motor current detector for detecting motor current flowing in a three-phase motor based on current flowing between an inverter driving the motor and a DC power supply, a specified voltage vector generating portion for generating a specified voltage vector indicating a voltage vector to which an applied voltage to the motor should follow based on a magnetic flux linkage of an armature winding of the motor, a specified voltage vector correcting portion for correcting the generated specified voltage vector, and a magnetic flux estimating portion for estimating the magnetic flux linkage based on the motor current and the specified voltage vector after the correction. The motor control device controls the motor via the inverter in accordance with the specified voltage vector after the correction.

More specifically, for instance, the specified voltage vector generated by the specified voltage vector generating portion is a specified voltage vector on a rotating coordinate, the specified voltage vector correcting portion corrects the specified voltage vector on the rotating coordinate in the process of converting the specified voltage vector on the rotating coordinate into specified three-phase voltage values on a three-phase fixed coordinate, and the motor control device supplies the specified three-phase voltage values corresponding to the specified voltage vector after the correction to the inverter so as to control the motor.

More specifically, for instance, the specified voltage vector generated by the specified voltage vector generating portion is a two-phase specified voltage vector on ab coordinates rotating step by step of 60 degrees of electrical angle in accordance with a phase of the specified voltage vector with respect to a predetermined fixed-axis.

More specifically, for instance, the specified voltage vector correcting portion decides whether or not the correction is necessary based on a magnitude of a coordinate axis component constituting the two-phase specified voltage vector on the ab coordinates, and if it is decided that the correction is necessary, the specified voltage vector correcting portion corrects the coordinate axis component so that the two-phase specified voltage vector on the ab coordinates is corrected.

More specifically, for instance, the motor control device further includes a coordinate converting portion for converting the two-phase specified voltage vector on the ab coordinates after the correction performed by the specified voltage vector correcting portion into a specified voltage vector on $\alpha\beta$ coordinates having fixed $\alpha$ and $\beta$ axes as its coordinate axes, and the magnetic flux estimating portion estimates the magnetic flux linkage based on the motor current and the specified voltage vector on the $\alpha\beta$ coordinates.

Alternatively, for instance, the motor control device further includes a coordinate converting portion for converting the two-phase specified voltage vector on the ab coordinates after the correction performed by the specified voltage vector correcting portion into a specified voltage vector on $\alpha\beta$ coordinates having fixed $\alpha$ and $\beta$ axes as its coordinate axes, and the magnetic flux estimating portion estimates coordinate axis components of the magnetic flux linkage on the $\alpha\beta$ coordinates based on coordinate axis components of the motor current on the $\alpha\beta$ coordinates and the specified voltage vector on the $\alpha\beta$ coordinates.

In addition, for instance, the motor control device further includes a torque estimating portion for estimating a torque generated by the motor based on the motor current and the estimated magnetic flux linkage, and the motor control device performs direct torque control of the motor based on the estimated torque.

Alternatively, for instance, the motor control device further includes a rotor position estimating portion for estimating a rotor position of the motor based on the estimated magnetic flux linkage, and the motor control device performs vector control of the motor based on the estimated rotor position.

A motor driving system according to an embodiment of the present invention includes a three-phase motor, an inverter for driving the motor, and the above-mentioned motor control device for controlling the inverter so as to control the motor.

Meanings and effects of the present invention will be apparent from the following description of embodiments. However, the embodiments described below are merely examples of the present invention, and the meanings of the present invention and terms of individual elements are not limited to those described in the following embodiments.

DETAILED DESCRIPTION OF THE PREFERRED EMBODIMENTS

Figure 1:
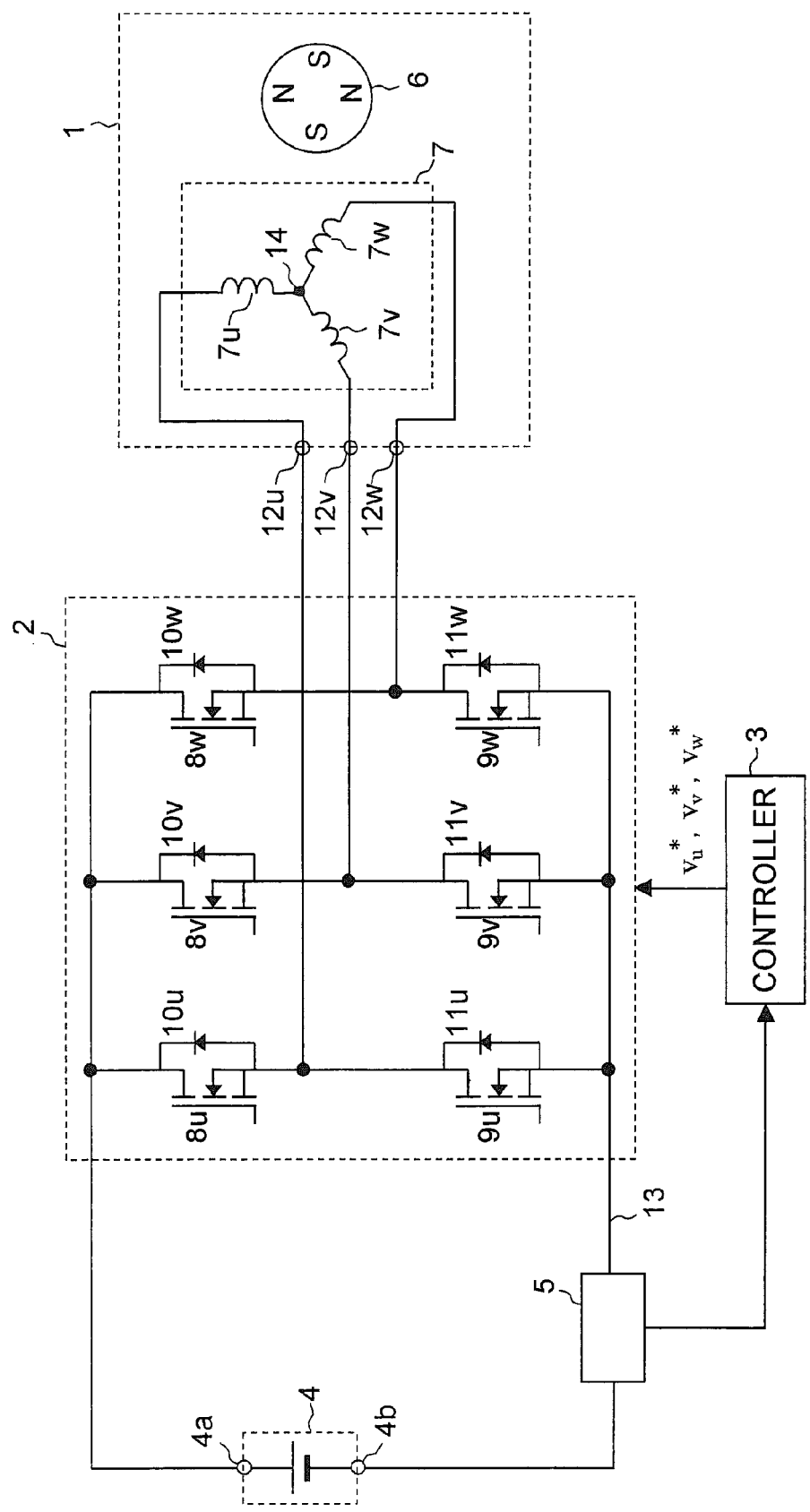
FIG. 1 is a block diagram of a general structure of a motor driving system according to an embodiment of the present invention.

Hereinafter, embodiments of the present invention will be described concretely with reference to the attached drawings. In the drawings to be referred to, the same portions are denoted by the same references so that overlapping descriptions for the same portions will be omitted as a general rule. Although first and second examples will be described later, items that are common to the examples and items to be referred to in each example will be described first.

FIG. 1 is a block structural diagram of a motor driving system according to an embodiment of the present invention. The motor driving system shown in FIG. 1 includes a three-phase permanent magnet synchronous motor 1 (hereinafter referred to as a "motor 1" simply), a PWM (Pulse Width Modulation) inverter 2 (hereinafter referred to as an "inverter 2" simply), a controller 3, a DC power supply 4 and a current sensor 5. The DC power supply 4 delivers a DC voltage between a positive output terminal 4a and a negative output terminal 4b so that the negative output terminal 4b becomes a low voltage side. The motor driving system shown in FIG. 1 adopts a single shunt current detecting method.

The motor 1 includes a rotor 6 to which a permanent magnet is provided and a stator 7 to which armature windings 7u, 7v and 7w of U-phase, V-phase and W-phase are provided. The armature windings 7u, 7v and 7w are connected at a neutral point 14 as a center in a form of Y-connection. Non-connection ends of the armature windings 7u, 7v and 7w that are opposite ends of the neutral point 14 are connected to terminals 12u, 12v and 12w, respectively.

The inverter 2 is provided with a half bridge circuit for the U-phase, a half bridge circuit for the V-phase and a half bridge circuit for the W-phase. Each of the half bridge circuits includes a pair of switching elements. In each of the half bridge circuits, the pair of switching elements are connected in series between the positive output terminal 4a and the negative output terminal 4b of the DC power supply 4, so that each of the half bridge circuits is supplied with a DC voltage from the DC power supply 4.

The half bridge circuit for the U-phase is made up of a high voltage side switching element 8u (hereinafter referred to as an upper arm 8u, too) and a low voltage side switching element 9u (hereinafter referred to as a lower arm 9u, too). The half bridge circuit for the V-phase is made up of a high voltage side switching element 8v (hereinafter referred to as an upper arm 8v, too) and a low voltage side switching element 9v (hereinafter referred to as a lower arm 9v, too). The half bridge circuit for the W-phase is made up of a high voltage side switching element 8w (hereinafter referred to as an upper arm 8w, too) and a low voltage side switching element 9w (hereinafter referred to as a lower arm 9w, too). In addition, the switching elements 8u, 8v, 8w, 9u, 9v and 9w are respectively connected to diodes 10u, 10v, 10w, 11u, 11v and 11w in parallel so that the direction from the low voltage side to the high voltage side of the DC power supply 4 becomes the forward direction. Each of the diodes works as a freewheel diode.

The connection node of the upper arm 8u and the lower arm 9u that are connected in series, the connection node of the upper arm 8v and the lower arm 9v that are connected in series, the connection node of the upper arm 8w and the lower arm 9w that are connected in series are connected to the terminals 12u, 12v and 12w, respectively. Note that field-effect transistors are shown as the switching elements in FIG. 1, but they can be replaced with IGBTs (Insulated Gate Bipolar Transistors) or the like.

The inverter 2 generates a PWM (Pulse Width Modulation) signal for each phase based on the specified three-phase voltage values supplied from the controller 3 and supplies the PWM signal to a control terminal (base or gate) of each switching element in the inverter 2, so that each switching element performs switching action. The specified three-phase voltage values that are supplied from the controller 3 to the inverter 2 include a U-phase specified voltage value $v_u^*$, a V-phase specified voltage value $v_v^*$ and a W-phase specified voltage value $v_w^*$. The specified voltage values $v_u^*$, $v_v^*$ and $v_w^*$ represent voltage levels (voltage values) of the U-phase voltage $v_u$, V-phase voltage $v_v$ and W-phase voltage $v_w$, respectively. The U-phase voltage $v_u$, the V-phase voltage $v_v$ and the W-phase voltage $v_w$ represent respectively voltages at the terminals 12u, 12v and 12w viewed from the neutral point 14 shown in FIG. 1. The inverter 2 controls on (conducting state) or off (nonconducting state) of the switching elements based on the specified voltage values $v_u^*$, $v_v^*$ and $v_w^*$.

Ignoring a dead time for preventing the upper arm and the lower arm of the same phase from becoming the on state simultaneously, the upper arm is on when the lower arm is off in each half bridge circuit. On the contrary, the upper arm is off when the lower arm is on. In the following description, the above-mentioned dead time will be ignored.

The DC voltage applied to the inverter 2 by the DC power supply 4 is converted into a three-phase AC voltage that is PWM-modulated (pulse width modulated), for example, by the switching action of the switching elements in the inverter 2. When the three-phase AC voltage is applied to the motor 1, current corresponding to the three-phase AC voltage flows in the armature winding (7u, 7v and 7w) so that the motor 1 is driven.

The current sensor 5 senses current that flows in a bus line 13 of the inverter 2 (hereinafter referred to as "bus current"). The bus current includes a DC component, so it may be regarded as DC current. In the inverter 2, the low voltage sides of the lower arms 9u, 9v and 9w are connected together to the negative output terminal 4b of the DC power supply 4. The wiring line to which the low voltage sides of the lower arms 9u, 9v and 9w are connected together is the bus line 13, and the current sensor 5 is inserted in the bus line 13 in series. The current sensor 5 transmits a signal indicating a current value of the bus current (detention current) to the controller 3. The controller 3 refers to an output signal of the current sensor 5 and the like so as to generate and deliver the above-mentioned specified three-phase voltage values. Note that the current sensor 5 is a shunt resistor, a current transformer or the like, for example. In addition, it is possible to insert the current sensor 5 not in the wiring (bus line 13) between the low voltage sides of the lower arms 9u, 9v and 9w and the negative output terminal 4b but in the wiring between the high voltage sides of the upper arms 8u, 8v and 8w and the positive output terminal 4a.

Here, with reference to FIGS. 2, 3, 4, 5A-5D, and 6, a relationship between the bus current and the phase current flowing in the armature winding of each phase and the like will be described. The current flowing in the armature windings 7u, 7v and 7w are referred to as U-phase current, V-phase current and W-phase current, respectively, and each of them (or a generic name of them) is referred to as phase current (see FIG. 1). Further, concerning the phase current, a polarity of the current direction flowing from the terminal 12u, 12v or 12w to the neutral point 14 is regarded as positive, while a polarity of the current direction flowing from the neutral point 14 outward is regarded as negative.

Figures 2, 3:
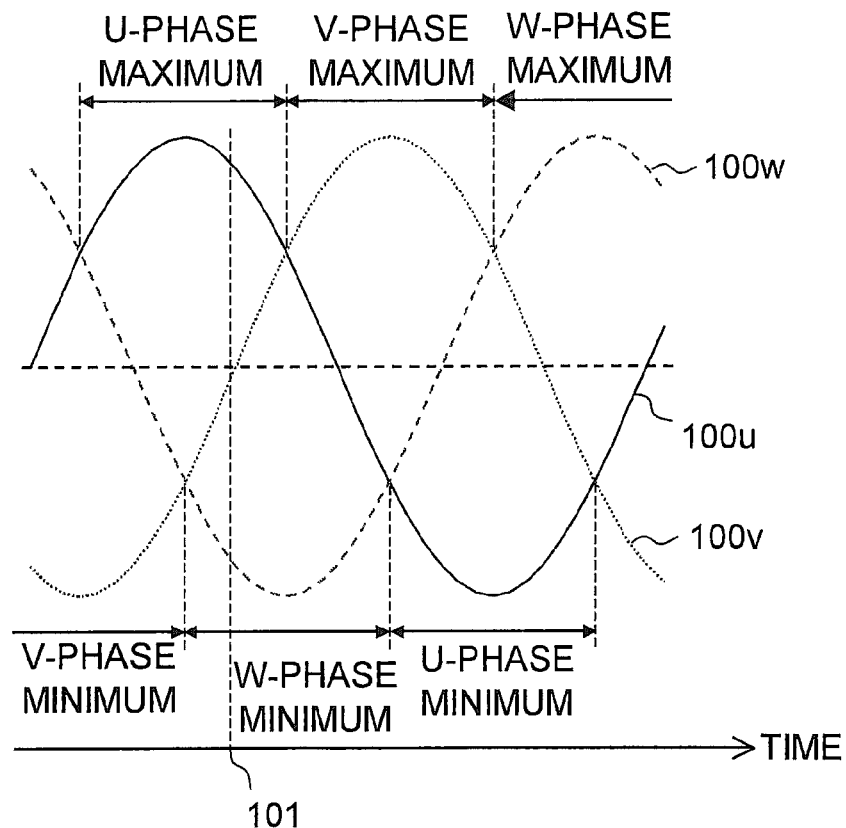
FIG. 2 is a diagram illustrating a typical example of three-phase AC voltage to be applied to the motor shown in FIG. 1.
FIG. 3 is a diagram of a table showing a relationship between energizing patterns of the motor shown in FIG. 1 and bus current.

FIG. 2 shows a typical example of the three-phase AC voltage that is applied to the motor 1. In FIG. 2, references 100u, 100v and 100w show waveforms of the U-phase voltage, the V-phase voltage and the W-phase voltage to be applied to the motor 1, respectively. Each of the U-phase voltage, the V-phase voltage and the W-phase voltage (or a generic name of them) is referred to as phase voltage. When sinusoidal current is to be supplied to the motor 1, an output voltage of the inverter 2 should be a sine wave. Although each of the phase voltages shown in FIG. 2 is an ideal sine wave, a distortion is added to the sine wave in the present embodiment (as described later in detail).

As shown in FIG. 2, a relationship among the voltage levels of the U-phase voltage, the V-phase voltage and the W-phase voltage alters as time passes. This relationship is determined by the specified three-phase voltage values, and the inverter 2 decides an energizing pattern for each phase in accordance with the specified three-phase voltage values. FIG. 3 shows this energizing pattern as a table. In FIG. 3, the first to the third columns from the left side indicate the energizing pattern. The fourth column will be described later.

The energizing pattern includes:

an energizing pattern "LLL" in which all the lower arms of the U, V and W-phases are turned on;

an energizing pattern "LLH" in which the upper arm of the W-phase is turned on while the lower arms of the U and V-phases are turned on;

an energizing pattern "LHL" in which the upper arm of the V-phase is turned on while the lower arms of the U and W-phases are turned on;

an energizing pattern "LHH" in which the upper arms of the V and W-phases are turned on while the lower arm of the U-phase is turned on;

an energizing pattern "HLL" in which the upper arm of the U-phase is turned on while the lower arms of the V and W-phases are turned on;

an energizing pattern "HLH" in which the upper arms of the U and W-phases are turned on while the lower arm of the V-phase is turned on;

an energizing pattern "HHL" in which the upper arms of the U and V-phases are turned on while the lower arm of the W-phase is turned on; and an energizing pattern "HHH" in which all the upper arms of the U, V and W-phases are turned on (references of the upper arms and the lower arms (8u and the like) are omitted).

Figure 4:
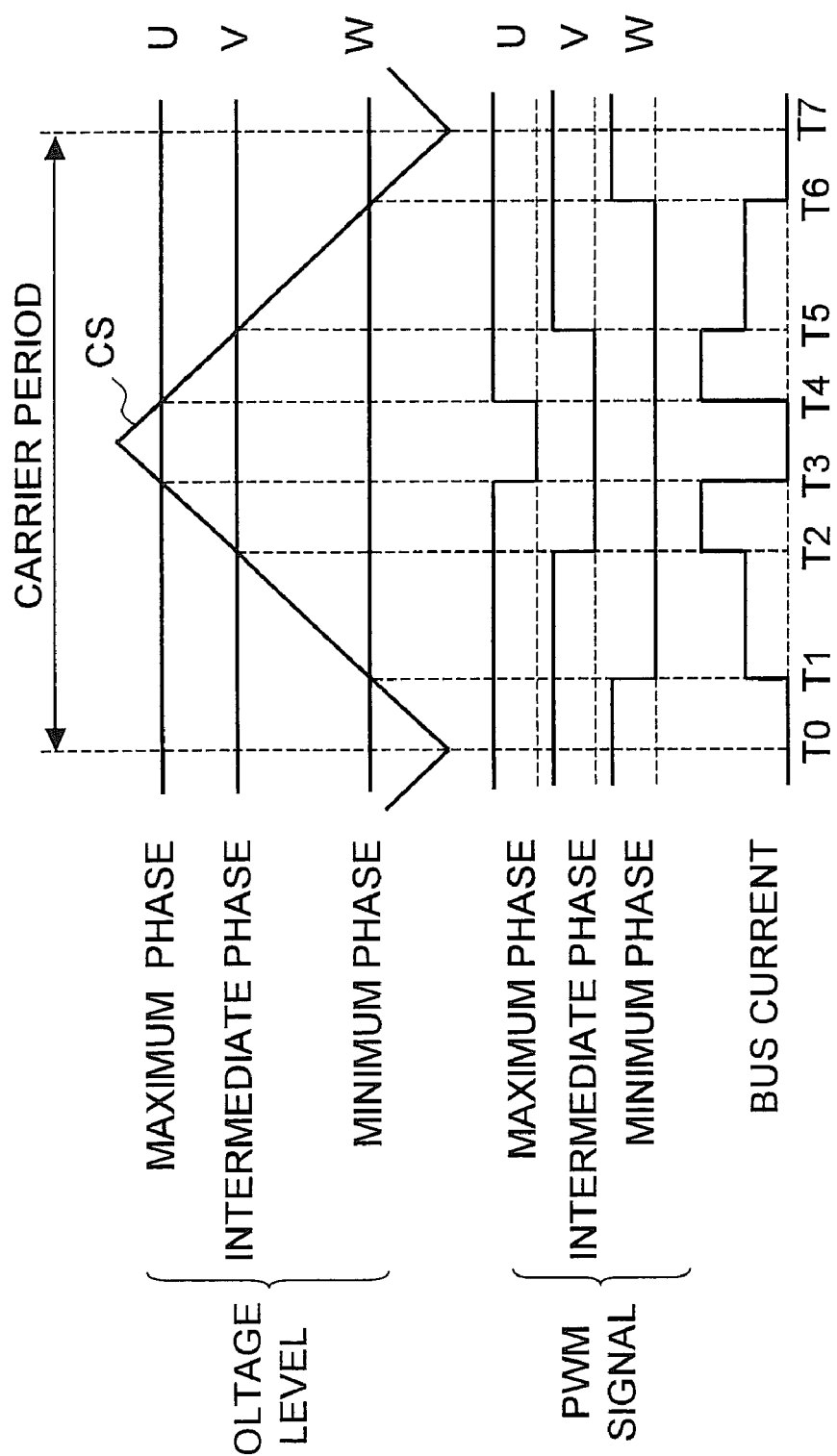
FIG. 4 is a diagram illustrating a relationship between a voltage level of each phase voltage and a carrier signal in the motor shown FIG. 1 and waveforms of a PWM signal and bus current corresponding to the relationship.

FIG. 4 shows a relationship between a voltage level of each phase voltage and a carrier signal in the case where three-phase modulation is performed and waveforms of the PWM signal and bus current corresponding to the relationship. The relationship between voltage levels of the individual phase voltages changes variously, but FIG. 4 shows it by noting a certain timing 101 shown in FIG. 2 for concrete description. More specifically, FIG. 4 shows the case where a voltage level of the U-phase voltage is the maximum, and a voltage level of the W-phase voltage is the minimum. The phase having the maximum voltage level is referred to as a "maximum phase", the phase having the minimum voltage level is referred to as a "minimum phase", and the phase whose voltage level is not the maximum or the minimum is referred to as an "intermediate phase". In the state shown in FIG. 4, the maximum phase, the intermediate phase and the minimum phase are the U-phase, the V-phase and the W-phase, respectively. In FIG. 4, reference CS denotes a carrier signal that is compared with a voltage level of each phase voltage. The carrier signal is a periodical signal of a triangular wave, and the period of the signal is referred to as a carrier period. Note that the carrier period is much shorter than a period of the three-phase AC voltage shown in FIG. 2. Therefore, if the triangular wave of the carrier signal shown in FIG. 4 is added to the diagram of FIG. 2, the triangular wave will look like a single line.

Further with reference to FIGS. 5A-5D, a relationship between the phase current and the bus current will be described. FIGS. 5A-5D are equivalent circuit diagrams of the armature windings and a periphery thereof at individual timings shown in FIG. 4.

Figure 5A:
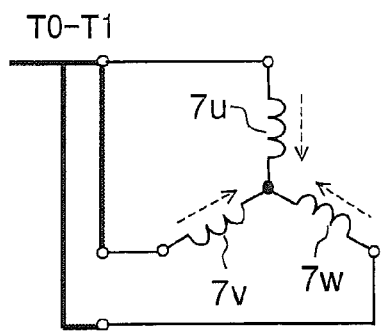
FIGS. 5A-5D are equivalent circuit diagrams of armature windings and a periphery thereof shown in FIG. 1 at each timing shown in FIG. 4.

A start timing of each carrier period, i.e., the timing when the carrier signal is a lowest level is referred to as T0. At the timing T0, the upper arms (8u, 8v and 8w) of the individual phases are turned on. In this case, as shown in FIG. 5A, a short circuit is formed so that current from or to the DC power supply 4 becomes zero. Therefore, the bus current becomes zero.

Figure 5B:
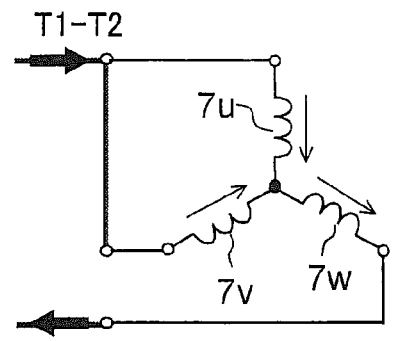

The inverter 2 refers to $v_u^*$, $v_v^*$ and $v_w^*$ so as to compare a voltage level of each phase voltage with the carrier signal. In the increasing process of a level of the carrier signal (voltage level), when a voltage level of the minimum phase crosses the carrier signal at the timing T1, the lower arm of the minimum phase is turned on. Then, as shown in FIG. 5B, current of the minimum phase flows as the bus current. In the example shown in FIG. 4, the lower arm 9w of the W-phase is in the turned-on state during the period from the timing T1 to a timing T2 that will be described later. Therefore, the W-phase current (having negative polarity) flows as the bus current.

Figure 5C:
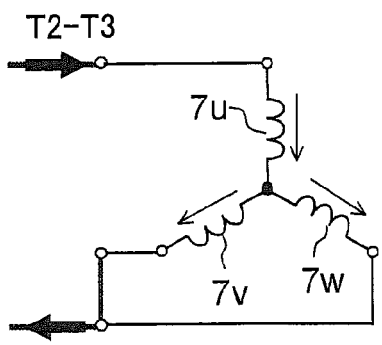

Further when a level of the carrier signal increases and reaches the timing T2 when a voltage level of the intermediate phase crosses the carrier signal, the upper arm of the maximum phase is turned on, and the lower arms of the intermediate phase and the minimum phase are turned on. Therefore, as shown in FIG. 5C, current of the maximum phase flows as the bus current. In the example shown in FIG. 4, the upper arm 8u of the U-phase is in the turned-on state, and the lower arms 9v and 9w of the V-phase and the W-phase are turned on in the period from the timing T2 to a timing T3 that will be described later. Therefore, the U-phase current (having positive polarity) flows as the bus current.

Figure 5D:
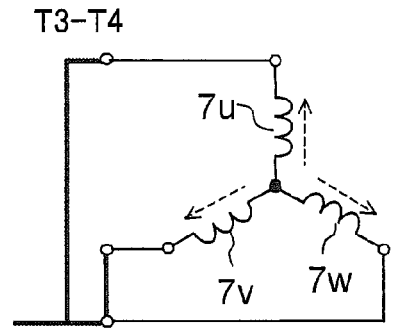

Further when a level of the carrier signal increases and reaches the timing T3 when a voltage level of the maximum phase crosses the carrier signal, the lower arms of all phases are turned on. Therefore, as shown in FIG. 5D, a short circuit is formed so that current from or to the DC power supply 4 becomes zero. Therefore, the bus current becomes zero.

At a middle timing between the timing T3 and a timing T4 that will be described later, the carrier signal reaches the maximum level, and then a level of the carrier signal decreases. In the decreasing process of a level of the carrier signal, the states as shown in FIGS. 5D, 5C, 5B and 5A appear one by one in this order. More specifically, in the decreasing process of a level of the carrier signal, it is supposed that a voltage level of the maximum phase crosses the carrier signal at the timing T4, a voltage level of the intermediate phase crosses the carrier signal at a timing T5, a voltage level of the minimum phase crosses the carrier signal at a timing T6, and a next carrier period starts at a timing T7. Then, the period between the timing T4 and the timing T5, the period between the timing T5 and the timing T6, the period between the timing T6 and the timing T7 have the same energizing patterns as the period T2-T3, the period T1-T2 and the period T0-T1, respectively.

Therefore, if the bus current is sensed in the period T1-T2 or T5-T6, the minimum phase current can be detected from the bus current. If the bus current is sensed in the period T2-T3 or T4-T5, the maximum phase current can be detected from the bus current. Then, the intermediate phase current can be obtained by calculation utilizing the fact that a sum of the three phase current values becomes zero. The fourth column in the table shown in FIG. 3 indicates a phase of current that flows as the bus current in each energizing pattern with a polarity of the current. For example, in the energizing pattern "HHL" corresponding to the eighth row in the table shown in FIG. 3, the W-phase current (having negative polarity) flows as the bus current.

Furthermore, the period obtained by removing the period between the timing T1 and the timing T6 from the carrier period indicates a pulse width of the PWM signal for the minimum phase. The period obtained by removing the period between the timing T2 and the timing T5 from the carrier period indicates a pulse width of the PWM signal for the intermediate phase. The period obtained by removing the period between the timing T3 and the timing T4 from the carrier period indicates a pulse width of the PWM signal for the maximum phase.

Figures 6, 7:
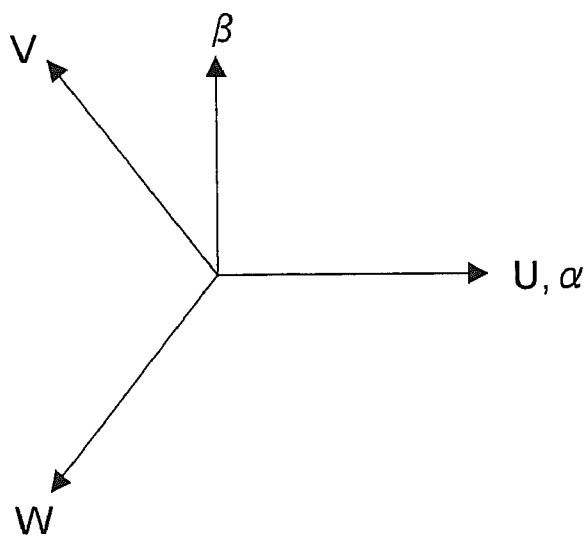
FIG. 6 is a diagram of a table showing combinations (modes) of a relationship of phase voltage levels in the motor shown in FIG. 1 and phases of current detected in the combinations.
FIG. 7 is a diagram illustrating a relationship among a U-phase axis, a V-phase axis, a W-phase axis, the $\alpha$-axis and the $\beta$-axis.

Although the above description exemplifies the case where the U-phase is the maximum phase and the W-phase is the minimum phase, there are six combinations of the maximum phase, the intermediate phase and the minimum phase. FIG. 6 shows the combinations as a table. When the U-phase voltage, the V-phase voltage and the W-phase voltage are denoted by $v_u$, $v_v$ and $v_w$, respectively, the state that satisfies "$v_u > v_v > v_w$" is referred to as a first mode, the state that satisfies "$v_v > v_u > v_w$" is referred to as a second mode, the state that satisfies "$v_v > v_w > v_u$" is referred to as a third mode, the state that satisfies "$v_w > v_v > v_u$" is referred to as a fourth mode, the state that satisfies "$v_w > v_u > v_v$" is referred to as a fifth mode, and the state that satisfies "$v_u > v_w > v_v$" is referred to as a sixth mode. The examples shown in FIGS. 4 and 5A-5D correspond to the first mode. In addition, FIG. 6 also indicates a phase of current sensed in each mode.

The U-phase specified voltage value $v_u^*$, the V-phase specified voltage value $v_v^*$ and the W-phase specified voltage value $v_w^*$ are specifically shown as set values of counter CntU, CntV and CntW, respectively. A larger set value is assigned to a higher phase voltage. For example, "CntU>CntV>CntW" holds in the first mode.

The counter (not shown) that is provided to the controller 3 increments its count value from zero every carrier period with reference to the timing T0. When the count value reaches CntW, the state in which the upper arm 8w of the W-phase is turned on is switched to the state in which the lower arm 9w is turned on. When the count value reaches CntV, the state in which the upper arm 8v of the V-phase is turned on is switched to the state in which the lower arm 9v is turned on. When the count value reaches CntU, the state in which the upper arm 8u of the U-phase is turned on is switched to the state in which the lower arm 9u is turned on. After the carrier signal reached the maximum level, the count value is decremented so that the switching action is performed reversely.

Therefore, in the first mode, the timing when the above-mentioned counter value reaches CntW corresponds to the timing T1. The timing when it reaches CntV corresponds to the timing T2. The timing when it reaches CntU corresponds to the timing T3. For this reason, in the first mode, while the counter value is incremented, the output signal of the current sensor 5 is sampled at a timing when the counter value is larger than CntW and is smaller than CntV, so that the W-phase current (having negative polarity) flowing as the bus current can be detected. Furthermore, the output signal of the current sensor 5 is sampled at a timing when the counter value is larger than CntV and is smaller than CntU, so that the U-phase current (having positive polarity) flowing as the bus current can be detected.

In the same manner, as shown in FIG. 6, in the second mode, the timing when the above-mentioned counter value reaches CntW corresponds to the timing T1. The timing when it reaches CntU corresponds to the timing T2. The timing when it reaches CntV corresponds to the timing T3. For this reason, in the second mode, while the counter value is incremented, the W-phase current (having negative polarity) can be detected from the bus current at the timing when the counter value is larger than CntW and is smaller than CntU. The V-phase current (having positive polarity) can be detected from the bus current at the timing when the counter value is larger than CntU and is smaller than CntV. The same is true on the third to the sixth modes.

In addition, sampling timing for sensing phase current of the minimum phase in the period T1-T2 (e.g., mid-term between the timing T1 and the timing T2) is denoted by ST1, and sampling timing for sensing phase current of the maximum phase in the period T2-T3 (e.g., mid-term between the timing T2 and the timing T3) is denoted by ST2.

Note that a pulse width (and a duty factor) of the PWM signal for each phase is specified by the set values CntU, CnuV and CntW of the counter as the specified three-phase voltage values ($v_u^*$, $v_v^*$ and $v_w^*$).

When each phase current is detected from the bus current based on the above-mentioned principle, as understood from FIG. 4, if the voltage levels of the maximum phase and the intermediate phase approach each other for example, a time length between the period T2-T3 and the period T4-T5 becomes short. If the bus current is detected by converting an analog output signal from the current sensor 5 shown in FIG. 1 into a digital signal and if this time length is extremely short, necessary time for A/D conversion or a converging time for a ringing (a current ripple that is caused by the switching) cannot be secured. As a result, phase current of the maximum phase cannot be sensed. In the same manner, if the voltage levels of the minimum phase and the intermediate phase approach each other, phase current of the minimum phase cannot be sensed. If the current values of two phases cannot be measured, phase current of three phases cannot be reproduced. As a result, a vector control of the motor 1 cannot be performed.

In the present embodiment, a voltage vector indicating an applied voltage to the motor 1 (specified voltage vector) is corrected so that a voltage level difference between the phase voltages is maintained to be larger than a predetermined value in the period in which it is considered that current values of two phases cannot be measured. Thus, the above-mentioned malfunction is resolved.

Prior to detailed description of this correction method, axes and state quantities (state variables) to be defined will be described. FIG. 7 shows a relationship among the U-phase axis, the V-phase axis and the W-phase axis that are armature winding fixed axes of the U-phase, the V-phase and the W-phase, and the α-axis and the β-axis that are perpendicular to each other. A phase of the V-phase axis leads by 120 degrees of electrical angle with respect to the U-phase axis, and a phase of the W-phase axis leads by 120 degrees of electrical angle with respect to the V-phase axis. In a space vector diagram including the coordinate relationship diagram shown in FIG. 7 and diagrams shown in FIGS. 8 and 9 as described later, the counterclockwise direction corresponds to the leading direction of the phase. The α-axis matches with the U-phase axis, and the β-axis leads by 90 degrees of electrical angle with respect to the α-axis. The U-phase axis, the V-phase axis, the W-phase axis, the α-axis and the β-axis are fixed axes having no relationship with rotation of the rotor 6. In addition, coordinates (coordinate system) having the α-axis and the β-axis selected as the coordinate axes are referred to as αβ coordinates (αβ coordinate system).

In addition, a whole motor voltage that is applied to the motor 1 from the inverter 2 is denoted by $V_a$, and a whole motor current that is supplied to the motor 1 from the inverter 2 is denoted by $I_a$. Then, an α-axis component and a β-axis component of the motor voltage $V_a$ are expressed as an α-axis voltage $v_\alpha$ and a β-axis voltage $v_\beta$, respectively. An α-axis component and a β-axis component of the motor current $I_a$ are expressed as an α-axis current $i_\alpha$ and a β-axis current $i_\beta$, respectively. A U-phase axis component, a V-phase axis component and a W-phase axis component of the motor voltage $V_a$ are expressed as a U-phase voltage $v_u$, a V-phase voltage $v_v$ and a W-phase voltage $v_w$, respectively. A U-phase axis component, a V-phase axis component and a W-phase axis component of the motor current $I_a$ are expressed as a U-phase current $i_u$, a V-phase current $i_v$ and a W-phase current $i_w$, respectively.

[Explanation of Correction Method]

Figure 8:
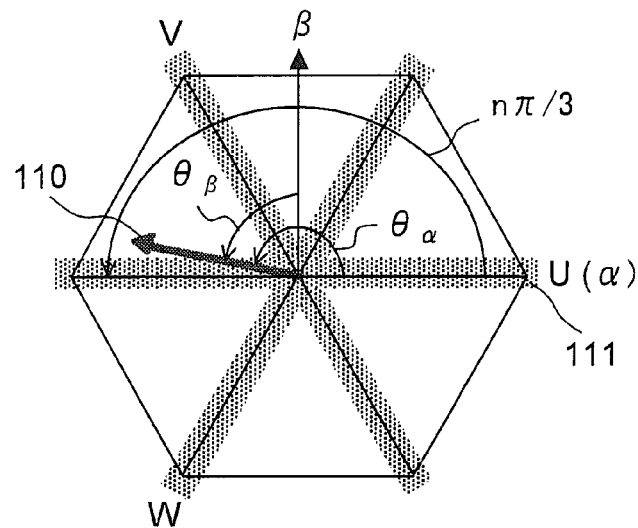
FIG. 8 is a space vector diagram illustrating a relationship among the U-phase axis, the V-phase axis, the W-phase axis, the $\alpha$-axis, the $\beta$-axis and the voltage vector according to a first example of the present invention.

A correction method of the voltage vector will be described. FIG. 8 illustrates a space vector diagram indicating a relationship among the U-phase axis, the V-phase axis, the W-phase axis, the α-axis, the β-axis and the voltage vector. The vector denoted by numeral 110 is the voltage vector. A phase of the voltage vector 110 viewed from the β-axis in the counterclockwise direction is denoted by $\theta_\beta$, and a phase of the voltage vector 110 viewed from the α-axis in the counterclockwise direction is denoted by $\theta_\alpha$. An angle quantity (nπ/3) shown in FIG. 8 will be described later.

The voltage vector 110 is the voltage (motor voltage $V_a$) applied to the motor 1, which is expressed as a two-dimensional vector quantity. For example, noting the αβ coordinates, the α-axis component and the β-axis component of the voltage vector 110 are $v_\alpha$ and $v_\beta$, respectively. Actually, an α-axis specified voltage value and a β-axis specified voltage value indicating target values of the α-axis voltage and the β-axis voltage in the motor driving system are calculated, which express the voltage vector 110. Therefore, the voltage vector is also translated into the specified voltage vector.

An asterisk region 111 with hatching that includes a vicinity of the U-phase axis, a vicinity of the V-phase axis and a vicinity of the W-phase axis indicates the region where current values of two phases cannot be detected. For example, if the V-phase voltage and the W-phase voltage are close to each other so that current values of two phases cannot be detected, the voltage vector 110 is located at a vicinity of the U-phase axis. If the U-phase voltage and the W-phase voltage are close to each other so that current values of two phases cannot be detected, the voltage vector 110 is located at a vicinity of the V-phase axis.

In this way, the region 111 where current values of two phases cannot be detected exist every 60 degrees of electrical angle with reference to the U-phase axis. If the voltage vector 110 exists in the region 111, the current values of two phases cannot be detected. Therefore, if the voltage vector exists in the region 111, the voltage vector should be corrected so that the voltage vector becomes a vector outside the region 111.

Figure 9:
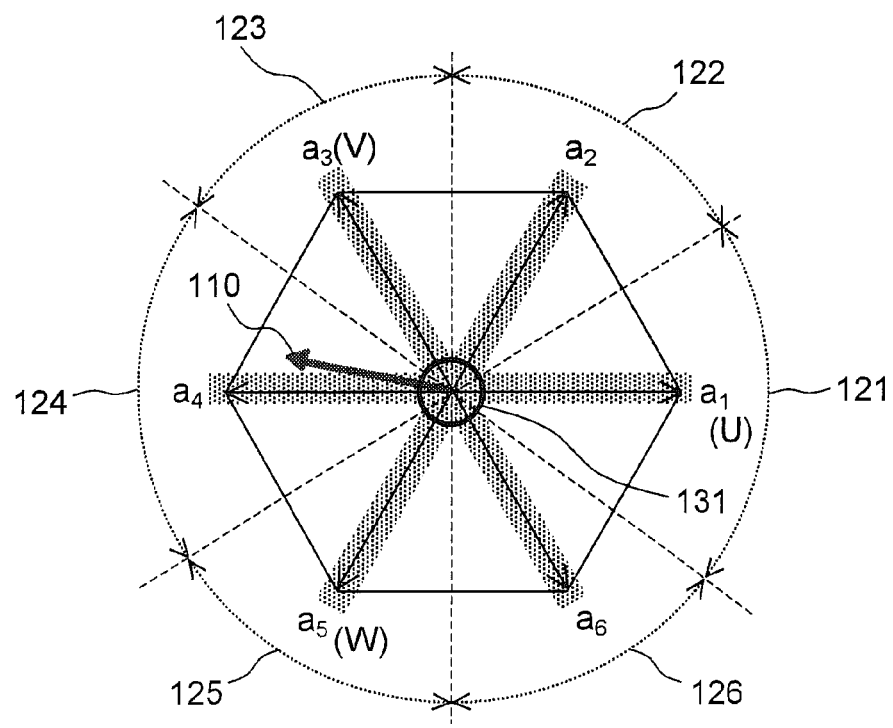
FIG. 9 is a diagram for explaining an a-axis defined in the embodiment of the present invention.

In order to perform this correction, noting characteristic of the region 111 in which current values of two phases cannot be detected, it is supposed that coordinates (coordinate system) rotate in a stepping manner every 60 degrees of electrical angle. The coordinates are referred to as ab coordinates (The coordinate system is referred to as ab coordinate system). Note that dq coordinates that will be described later in a second example are coordinates that rotate continuously. The ab coordinates has an a-axis and a b-axis as coordinate axes perpendicular to each other. FIG. 9 illustrates six axes each of which can be the a-axis. The a-axis becomes any one of $a_1$ to $a_6$ axes in accordance with a phase of the voltage vector 110 with respect to a predetermined fixed-axis. It is supposed that this predetermined fixed-axis is the U-phase axis (i.e., the α-axis ). Then, the a-axis becomes any one of $a_1$ to $a_6$ axes in accordance with the phase $\theta_\alpha$. The $a_1$ axis, the $a_3$ axis and the $a_5$ axis match the U-phase axis, the V-phase axis and the W-phase axis, respectively. The $a_2$ axis, the $a_4$ axis and the $a_6$ axis match respectively an intermediate axis between the $a_1$ axis and the $a_3$ axis, an intermediate axis between the $a_3$ axis and the $a_5$ axis, and an intermediate axis between the $a_5$ axis and the $a_1$ axis. Note that a circle denoted by reference 131 will be described later.

If the voltage vector 110 is located in the range denoted by reference 121, i.e., "$11\pi/6 \leq \theta_\alpha < 0$" or "$0 \leq \theta_\alpha < \pi/6$" holds, the a-axis becomes the $a_1$ axis.

If the voltage vector 110 is located in the range denoted by reference 122, i.e., "$\pi/6 \leq \theta_\alpha < \pi/2$" holds, the a-axis becomes the $a_2$ axis.

If the voltage vector 110 is located in the range denoted by reference 123, i.e., "π/2≦θ_α<5 π/6" holds, the a-axis becomes the a_3 axis.

If the voltage vector 110 is located in the range denoted by reference 124, i.e., "5 π/6≦θ_α<7π/6" holds, the a-axis becomes the a_4 axis.

If the voltage vector 110 is located in the range denoted by reference 125, i.e., "7 π/6≦θ_α<3π/2" holds, the a-axis becomes the a_5 axis.

If the voltage vector 110 is located in the range denoted by reference 126, i.e., "3 π/2≦θ_α<11 π/6" holds, the a-axis becomes the a_6 axis.

For example, if the voltage vector 110 is located at the position shown in FIG. 9, the a-axis becomes the a_4 axis.

In this way, the a-axis rotates in a stepping manner every 60 degrees along with rotation of the voltage vector, and the b-axis also rotates in a stepping manner every 60 degrees together with the a-axis that is orthogonal to the b-axis. The a-axis and the b-axis can be expressed to be coordinate axes that are digitized every 60 degrees and rotate every 60 degrees. For this reason, the a-axis is always located at the center of the region where current values of two phases cannot be detected. In this correction method, a voltage vector on the dq coordinates is converted into that on the ab coordinates. Then, the a-axis component and the b-axis component of the voltage vector converted into that on the ab coordinates are referred to and are corrected if necessary (for instance, the b-axis component is increased by the correction).

More concrete method of realizing this correction process will be described. A phase of the axis to which the voltage vector 110 is closest among the $a_1$ to $a_6$ axes is expressed by $(n\pi/3)$ with reference to the U-phase axis (see FIG. 8). Here, "n" is a quotient that is obtained by dividing $(\theta_\beta+2\pi/3)$ by $\pi/3$ or a quotient that is obtained by dividing $(\theta_\alpha+\pi/6)$ by $\pi/3$. The quotient is an integer of a value obtained by dividing a dividend by a divisor, when a remainder is omitted. $\theta_\beta$ and $\theta_\alpha$ can be calculated in accordance with the equations (1-1a) and (1-1b) below.

$$\theta_\beta = \tan^{-1}(-v_\alpha/v_\beta) \quad (1\text{-}1a)$$

$$\theta_\alpha = \tan^{-1}(v_\beta/v_\alpha) \quad (1\text{-}1b)$$

The ab coordinates correspond to coordinates obtained by rotating the αβ coordinates by an angle (nπ/3). Therefore, regarding that the voltage vector 110 is a voltage vector on the ab coordinates and that the a-axis component and the b-axis component of the voltage vector 110 are the a-axis voltage $v_a$ and the b-axis voltage $v_b$, the α-axis voltage $v_\alpha$, the β-axis voltage $v_\beta$, the a-axis voltage $v_a$ and the b-axis voltage $v_b$ satisfy the coordinate conversion equation (1-2) below.

$$\begin{bmatrix} v_a \\ v_b \end{bmatrix} = \begin{bmatrix} \cos(-n\pi/3) & -\sin(-n\pi/3) \\ \sin(-n\pi/3) & \cos(-n\pi/3) \end{bmatrix} \begin{bmatrix} v_\alpha \\ v_\beta \end{bmatrix} \quad (1\text{-}2)$$

Figure 10:
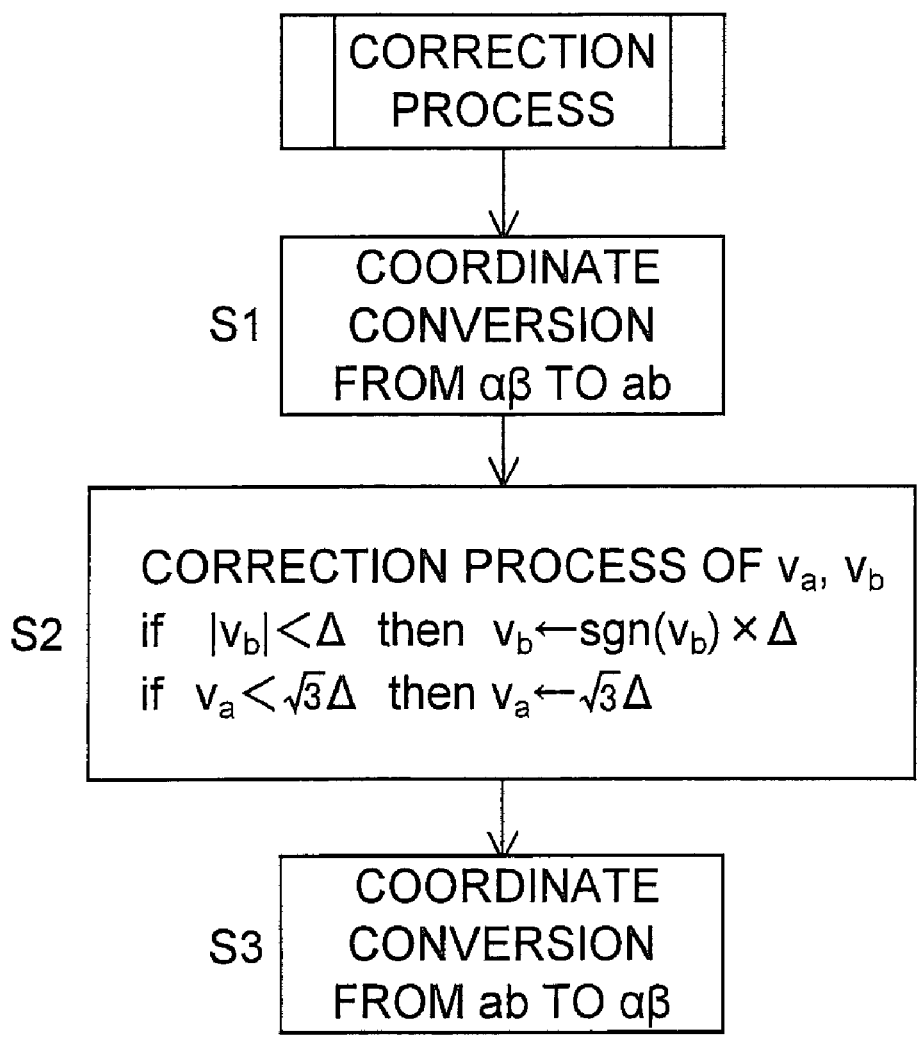
FIG. 10 is a flowchart showing a procedure of a correction process of the voltage vector according to the embodiment of the present invention.

Then, the correction process is performed by referring to the a-axis voltage $v_a$ and the b-axis voltage $v_b$ calculated in accordance with the equation (1-2). FIG. 10 shows a flowchart indicating a procedure of this correction process. In the step S1, the coordinate conversion is performed in accordance with the equation (1-2). In the next step S2, the correction process with respect to $v_a$ and $v_b$ is performed.

In the step S2, it is decided first whether or not a value that indicates an amplitude of the b-axis voltage $v_b$ (i.e., an absolute value of the b-axis voltage $v_b$) is smaller than a predetermined threshold value Δ (here, Δ>0). In other words, it is decided whether or not the expression (1-3) as below is satisfied. Further, if the absolute value of the b-axis voltage $v_b$ is smaller than the threshold value Δ and the b-axis voltage $v_b$ is positive, the correction is performed so that $v_b$ equals Δ. If the absolute value of the b-axis voltage $v_b$ is smaller than the threshold value Δ and the b-axis voltage $v_b$ is negative, the correction is performed so that $v_b$ equals (−Δ). If the absolute value of the b-axis voltage $v_b$ is more than or equal to the threshold value Δ, the correction is not performed with respect to $v_b$.

Furthermore, in the step S2, it is also decided whether or not the a-axis voltage $v_a$ satisfies the equation (1-4) below. If it satisfies the equation (1-4), the correction of $v_a$ is performed so that $v_a$ becomes equal to the right side of the equation (1-4). If $v_a$ does not satisfy the equation (1-4) below, the correction is not performed with respect to $v_a$. Note that the equation (1-4) is used for deciding whether the voltage vector 110 is included inside the circle 131 shown in FIG. 9. The state where the voltage vector 110 is included inside the circle 131 corresponds to the state where the phase voltages of three phases are close to each other. In this state, the current values of two phases cannot be detected regardless of a value of the b-axis voltage $v_b$.

$$|v_b| < \Delta \quad (1\text{-}3)$$

$$v_a < \sqrt{3}\Delta \quad (1\text{-}4)$$

Figure 11A:
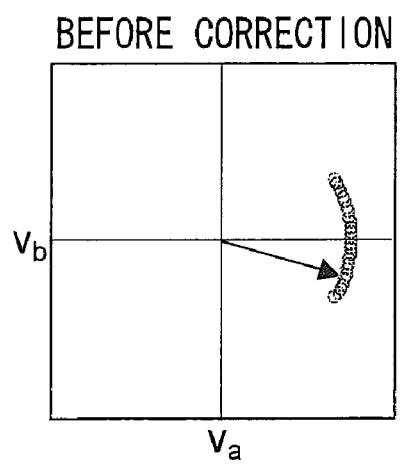
FIG. 11A is a diagram illustrating a voltage vector locus on the ab coordinates before the correction process shown in FIG. 10.
Figure 11B:
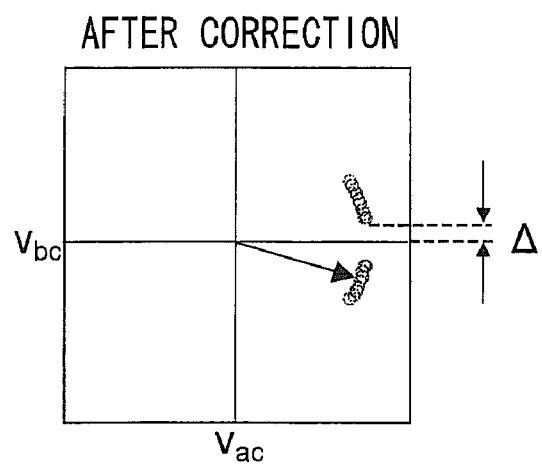
FIG. 11B is a diagram illustrating the voltage vector locus on the ab coordinates after the correction process shown in FIG. 10.

FIGS. 11A and 11B illustrate a locus of the voltage vector (110) on the ab coordinates before and after the correction process performed in the step S2. FIG. 11A shows a voltage vector locus on the ab coordinates before the correction, and FIG. 11B shows a voltage vector locus on the ab coordinates after the correction. Note that the a-axis component and the b-axis component of the voltage vector 110 after the correction process in the step S2 are denoted by $v_{ac}$ and $v_{bc}$, respectively ("$v_{ac}=v_a$" and "$v_{bc}=v_b$" hold if the correction is not performed actually). FIGS. 11A and 11B exemplify a case where the b-axis voltage is corrected. Each of FIGS. 11A and 11B illustrates a lot of plotted dots indicating voltage values at individual timings. The voltage vector before the correction corresponding to FIG. 11A can be located at a vicinity of the a-axis where current values of two phases cannot be detected, but the voltage vector after the correction corresponding to FIG. 11B is not located at a vicinity of the a-axis by the correction with respect to $v_b$.

After the correction process in the step S2, the process goes to the step S3 where the voltage vector 110 after the correction on the ab coordinates is converted into the voltage vector 110 on the αβ coordinates. When the α-axis component and the β-axis component of the voltage vector 110 after the correction process in the step S2 are denoted respectively by $v_{\alpha c}$ and $v_{\beta c}$, the coordinate conversion in the step S3 is performed in accordance with the equation (1-5).

$$\begin{bmatrix} v_{\alpha c} \\ v_{\beta c} \end{bmatrix} = \begin{bmatrix} \cos(n\pi/3) & -\sin(n\pi/3) \\ \sin(n\pi/3) & \cos(n\pi/3) \end{bmatrix} \begin{bmatrix} v_{ac} \\ v_{bc} \end{bmatrix} \quad (1\text{-}5)$$

Figure 12A:
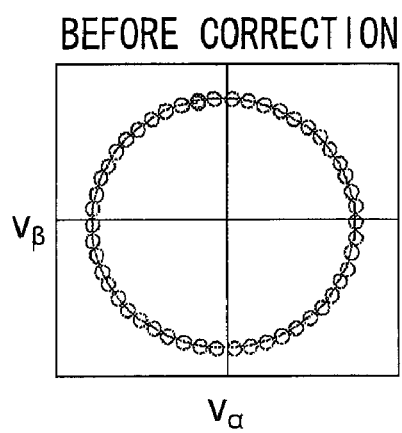
FIG. 12A is a diagram illustrating a voltage vector locus on the $\alpha\beta$ coordinates before the correction process shown in FIG. 10.
Figure 12B:
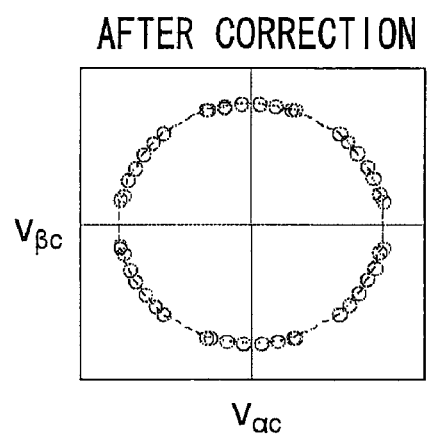
FIG. 12B is a diagram illustrating the voltage vector locus on the αβ coordinates after the correction process shown in FIG. 10.

FIGS. 12A and 12B illustrate a locus of the voltage vector (110) on the αβ coordinates before and after the correction process described above. FIG. 12A shows a voltage vector locus on the αβ coordinates before the correction, and FIG. 12B shows a voltage vector locus on the αβ coordinates after the correction. This correction process makes a region where a voltage vector is not located exist every 60 degrees of electrical angle in the αβ coordinates as fixed coordinates.

Figure 13:
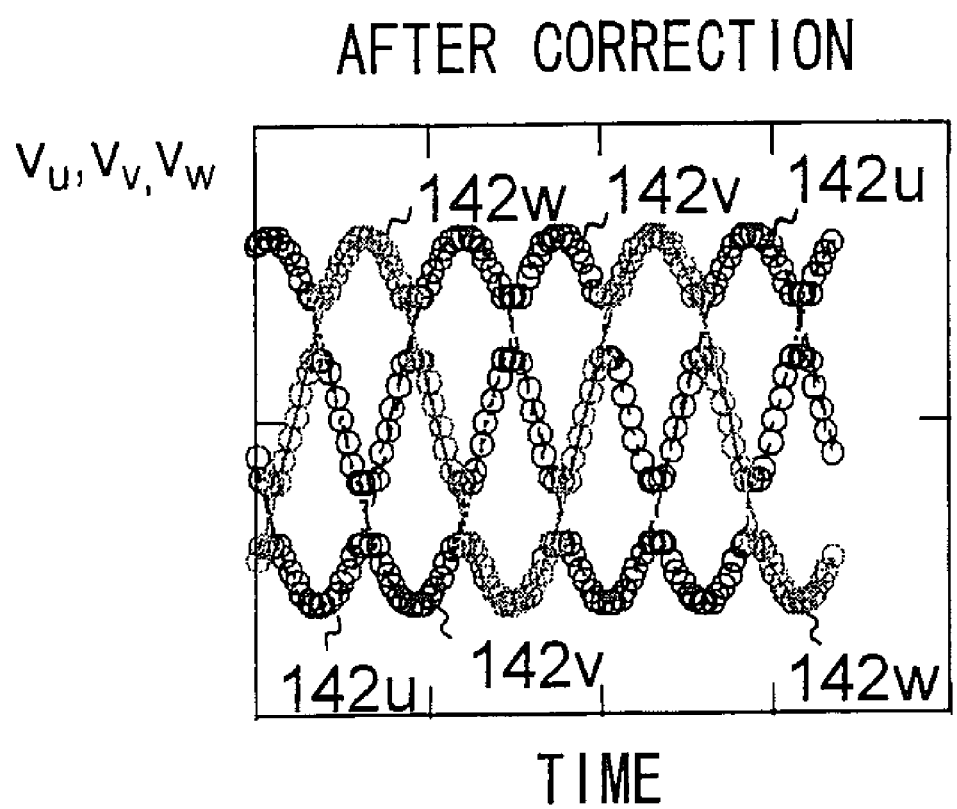
FIG. 13 is a diagram illustrating voltage waveforms of the U-phase voltage, the V-phase voltage and the W-phase voltage obtained after the correction process shown in FIG. 10.

The voltage vector (specified voltage vector) after the correction is converted into individual voltage components of the U-phase, the V-phase and the W-phase finally. FIG. 13 illustrates waveforms of voltages $v_u$, $v_v$ and $v_w$ obtained after the above-mentioned correction process, in which the horizontal axis represents time. In FIG. 13, plotted dots 142u arranged on a distorted sine wave shows a locus of the voltage $v_u$, plotted dots 142v arranged on a distorted sine wave shows a locus of the voltage $v_v$, and plotted dots 142w arranged on a distorted sine wave shows a locus of the voltage $v_w$. As understood from FIG. 13, a voltage difference between phase voltages is secured to be larger than a predetermined value by the above-mentioned correction process.

Hereinafter, first and second examples are described as examples to which the correction process (correction method) described above is applied. Note that items described in one example (e.g., the first example) can be applied to another example, as long as no contradiction arises.

FIRST EXAMPLE

Figure 14:
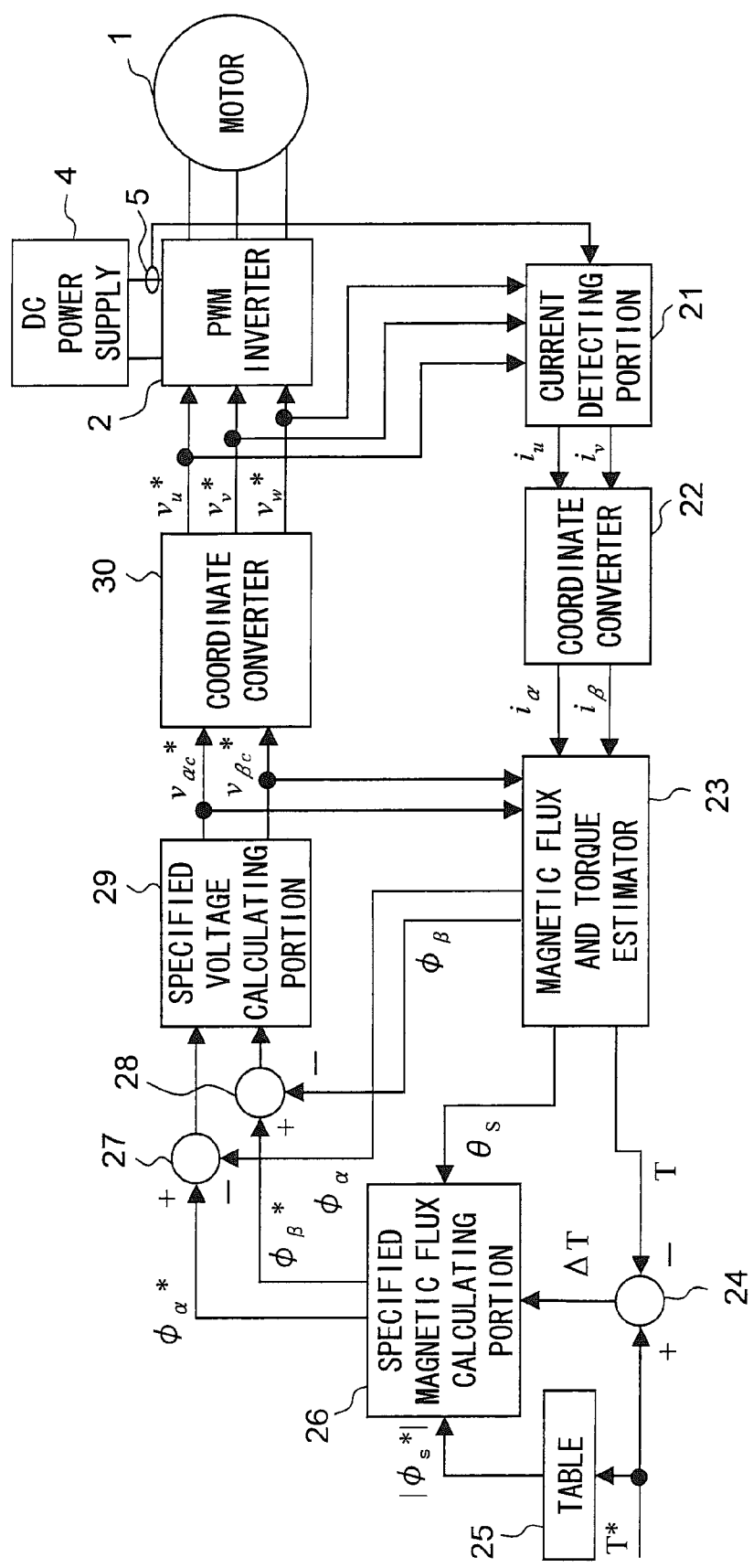
FIG. 14 is a block diagram of a structure of a motor driving system according to a first example of the present invention.

The first example will be described. FIG. 14 is a block diagram illustrating a structure of a motor driving system according to the first example. In the motor driving system shown in FIG. 14, so-called direct torque control is performed. If an interior permanent magnet motor or the like is used, magnetic flux of a permanent magnet or an inductance distribution may have harmonics in many cases. For instance, the magnetic flux of the permanent magnet linking with the U-phase armature winding traces a waveform of a sine wave with respect to a change in rotor phase ideally, but actually the waveform includes harmonics, which causes a distortion of an induction voltage (electromotive force) generated by rotation of the permanent magnet. In the same manner, a d-axis inductance and a q-axis inductance of the armature winding also include harmonics. It is known that such harmonics can cause a torque ripple.

When the vector control is performed so that the d-axis current and the q-axis current become constant, the generated torque becomes constant if the magnetic flux of the permanent magnet and the inductance distribution have no harmonic. Actually, however, they usually have harmonics, so the generated torque has a ripple. In the direct torque control, the magnetic flux linking with the armature winding of the stator is estimated, and a torque is estimated based on the estimated magnetic flux and the motor current so that the torque is controlled directly. Since the estimated magnetic flux is affected by the harmonics, the estimation of the torque is also affected by the harmonics. Since the direct torque control is performed based on the estimated torque, the torque ripple can be reduced even if the magnetic flux of the permanent magnet or the inductance distribution has harmonics.

A motor control system shown in FIG. 14 includes a motor 1, an inverter 2, a DC power supply 4 and a current sensor 5. It also includes individual portions denoted by reference numerals 21 to 30. In the first example, the controller 3 shown in FIG. 1 is made up of individual portions denoted by reference numerals 21 to 30.

As described above, the current sensor 5 senses the bus current and outputs a signal indicating a current value of the bus current. A current detecting portion 21 refers to the specified three-phase voltage values $v_u^*$, $v_v^*$ and $v_w^*$ delivered from the coordinate converter 30 so as to specify the maximum phase, the intermediate phase and the minimum phase. Based on the specified three-phase voltage values $v_u^*$, $v_v^*$ and $v_w^*$, it also decides the timings ST1 and ST2 (see FIG. 6) for sampling the output signal of the current sensor 5, so as to calculate and deliver the U-phase current $i_u$ and the V-phase current $i_v$ from current values of the bus current (output signal values of the current sensor 5) obtained at the timings ST1 and ST2. On this occasion, a relational expression "$i_u+i_v+i_w=0$" is used if necessary.

As described above with reference to FIG. 6, $v_u^*$, $v_v^*$ and $v_w^*$ are expressed as counter set values CntU, CntV and CntW, respectively. The current detecting portion 21 compares the counter set values CntU, CntV and CntW with each other based on $v_u^*$, $v_v^*$ and $v_w^*$ so as to specify which of the first to the sixth modes the present time belongs to, and it determines the timings ST1 and ST2 when the bus current should be detected with the specified mode taken into account. For instance, if "CntU>CntV>CntW" holds, the present time is decided to belong the first mode, so that the timing corresponding to a value between the set values CntW and CntV is defined to be ST1 while the timing corresponding to a value between the set values CntV and CntU is defined to be ST2. If the present time belongs to the first mode, bus current values detected at the timings ST1 and ST2 are $-i_w$ and $i_u$, respectively.

The coordinate converter 22 converts the three-phase current detected by the current detecting portion 21 into two-phase current on the αβ coordinates. More specifically, $i_u$ and $i_v$ as the U-phase axis component and the V-phase axis component of the motor current $I_a$ are converted into $i_\alpha$ and $i_\beta$ as the α-axis component and the β-axis component of the motor current $I_a$. The current components $i_\alpha$ and $i_\beta$ obtained from this conversion are supplied to a magnetic flux and torque estimator 23.

Figure 25:
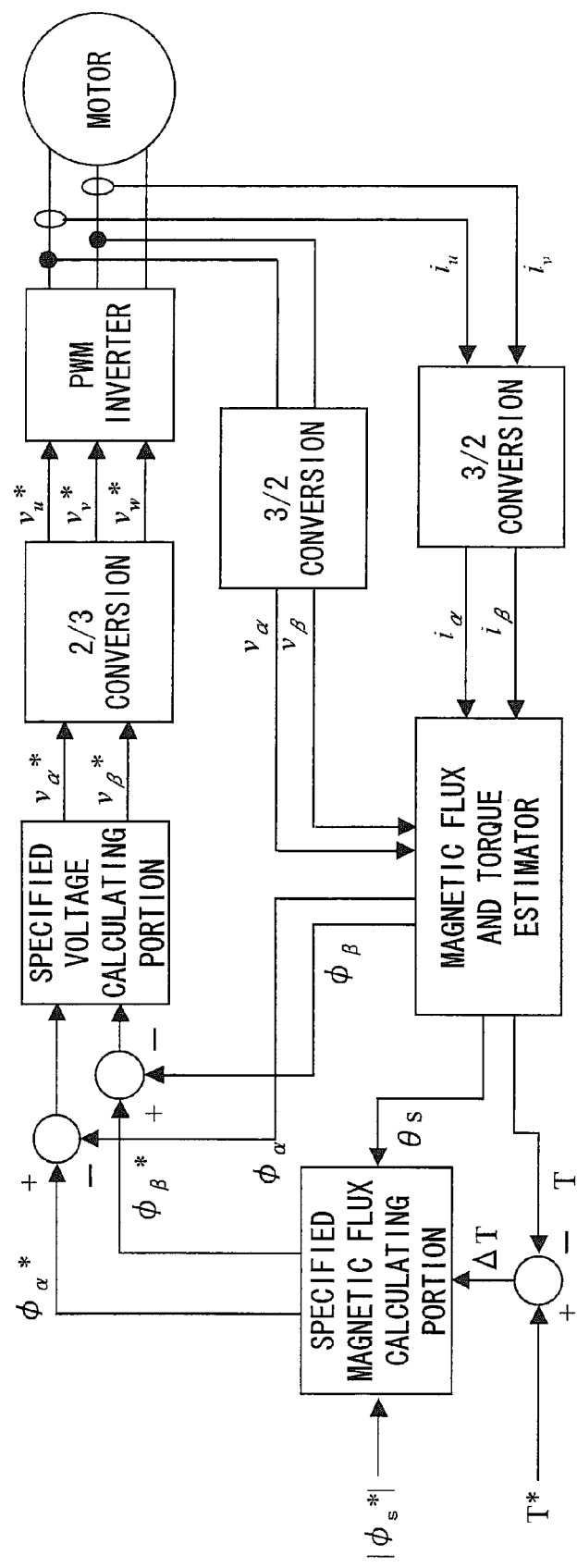
FIG. 25 is a block diagram illustrating a general structure of a conventional motor driving system that realizes a direct torque control.

An α-axis component and a β-axis component of the magnetic flux linkage of the armature windings (7u, 7v and 7w) shown in FIG. 1 are referred to as an α-axis magnetic flux $\phi_\alpha$ and a β-axis magnetic flux $\phi_\beta$, respectively. Similarly to the motor driving system shown in FIG. 25, the magnetic flux and torque estimator 23 performs an estimation of the magnetic flux based on the α-axis current, the β-axis current and the specified voltage vector. As the specified voltage vector for this estimation, the specified voltage vector after the correction process described above is used. More specifically, the magnetic flux and torque estimator 23 estimates the α-axis magnetic flux $\phi_\alpha$ and the β-axis magnetic flux $\phi_\beta$ based on $i_\alpha$ and $i_\beta$ from the coordinate converter 22 and $v_{\alpha c}^*$ and $v_{\beta c}^*$ from a specified voltage calculating portion 29. The symbols $v_{\alpha c}^*$ and $v_{\beta c}^*$ represent target values to which $v_{\alpha c}$ and $v_{\beta c}$ appearing in the above equation (1-5) should follow. The symbols $v_{\alpha c}^*$ and $v_{\beta c}^*$ are coordinate axis components forming the specified voltage vector after the correction on the αβ coordinates, and the meaning thereof will be apparent from description of the specified voltage calculating portion 29 that will be described later.

More specifically, the magnetic flux and torque estimator 23 estimates $\phi_\alpha$ and $\phi_\beta$ in accordance with the equation (2-1) and (2-2). After that, the magnetic flux and torque estimator 23 calculates a phase θs of the magnetic flux linkage vector made up of $\phi_\alpha$ and $\phi_\beta$ with respect to the α-axis based on $\phi_\alpha$ and $\phi_\beta$ estimated by itself in accordance with the equation (2-3) below, and it estimates a torque T generated by the motor 1 in accordance with the equation (2-4) below. The integrals in the right-hand sides of the equations (2-1) and (2-2) are integrals with respect to time t, and the integral interval is from a reference time (t=0) to the present time.

$$\phi_\alpha = \int(v_{\alpha c}^* - R_a i_\alpha)dt + \phi_{\alpha|t=0} \quad (2\text{-}1)$$

$$\phi_\beta = \int(v_{\beta c}^* - R_a i_\beta)dt + \phi_{\beta|t=0} \quad (2\text{-}2)$$

$$\theta_s = \tan^{-1}(\phi_\beta/\phi_\alpha) \quad (2\text{-}3)$$

$$T = P_N(\phi_\alpha i_\beta - \phi_\beta i_\alpha) \quad (2\text{-}4)$$

Here, $R_a$ represents a resistance value of one phase of the armature windings ($7u$, $7v$ and $7w$), $P_N$ represents the number of pole pairs of the motor 1, and "$\phi_{\alpha|t=0}$" and "$\phi_{\beta|t=0}$" represent values of the $\phi_\alpha$ and $\phi_\beta$ at time $t=0$ (i.e., initial values of $\phi_\alpha$ and $\phi_\beta$), respectively.

In addition, a state quantity that will appear in equations or the like that will be described later is defined here. Symbols $L_d$ and $L_q$ represent respectively a d-axis inductance (d-axis component of an inductance of the armature windings of the motor 1) and a q-axis inductance (q-axis component of an inductance of the armature windings of the motor 1), and a symbol ($\Phi_a$ represents the magnetic flux linkage of an armature due to the permanent magnet of the rotor 6 of the motor 1. Symbols $i_d$ and $i_q$ represent respectively a d-axis current as a d-axis component and a q-axis current as a q-axis component of the motor current $I_a$.

The d-axis is defined in the direction of the north pole of the permanent magnet of the rotor 6, and the q-axis leads the d-axis by $\pi/2$. The d-axis and the q-axis will be further described later in a description of the second example. Note that $R_a$, $L_d$, $L_q$, $\Phi_a$, $P_N$, "$\phi_{\alpha|t=0}$" and "$\phi_{\beta|t=0}$" are determined in advance in a designing stage of the motor driving system.

The subtracter 24 calculates a torque error $\Delta T$ (=T*−T) between the torque T estimated by the magnetic flux and torque estimator 23 and the specified torque value T* indicating a target value of the torque T. As to the direct torque control, it is necessary to give a specified value of the amplitude of the magnetic flux linkage together with the specified torque value T*. The specified value of the amplitude is represented by $|\phi_S^*|$. The specified value $|\phi_S^*|$ indicates a target value of a magnitude of the magnetic flux linkage vector made up of $\phi_\alpha$ and $\phi_\beta$ (i.e., amplitude of the magnetic flux linkage). In general, an amplitude $|\phi_S|$ of the magnetic flux linkage and the torque T are expressed by the equation (2-5) and the equation (2-6) below. Therefore, in order to realize a maximum torque control, for instance, the calculation equation (2-7) of the d-axis current for realizing the maximum torque control is substituted into the equation (2-5) and the equation (2-6), so that table data indicating a relationship between $|\phi_S|$ and T are generated in advance. The table data are stored in the table 25 shown in FIG. 14, and $|\phi_S|$ and T are dealt with as $|\phi_S^*|$ and T*. Then, the table 25 is used for calculating $|\phi_S^*|$ from the specified torque value T*.

$$|\phi_S| = \sqrt{(L_d i_d + \Phi_a)^2 + (L_q i_q)^2} \quad (2\text{-}5)$$

$$T = P_N(\Phi_a i_q - (L_q - L_d)i_d i_q) \quad (2\text{-}6)$$

$$i_d = \frac{\Phi_a}{2(L_q - L_d)} - \sqrt{\frac{\Phi_a^2}{4(L_q - L_d)^2} + i_q^2} \quad (2\text{-}7)$$

The specified value $|\phi_S^*|$ obtained from the table 25 is supplied to the specified magnetic flux calculating portion 26. However, if flux-weakening control is required in the case where the motor 1 is rotating at high speed or in other cases, $|\phi_S^*|$ is calculated in accordance with the equation (2-8) below and is supplied to the specified magnetic flux calculating portion 26. Here, $\omega$ represents an electrical angle speed in rotation of the rotor 6 of the motor 1 (electrical angle speed of the d-axis), and $V_{om}$ represents a limitation value of the motor voltage $V_a$ that should be limited by the flux-weakening control.

$$|\phi_S^*| = \frac{V_{om}}{\omega} \quad (2\text{-}8)$$

Figure 15:
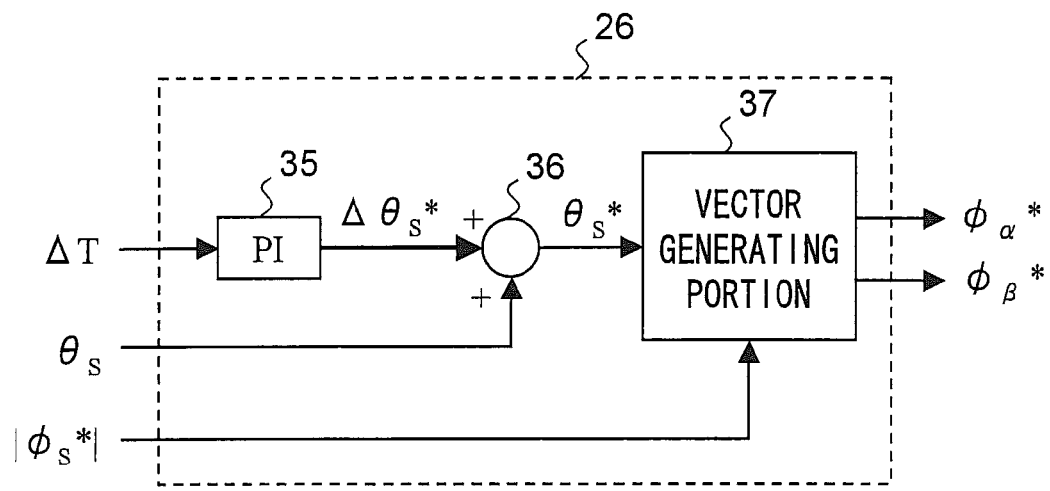
FIG. 15 is an internal block diagram of a specified magnetic flux calculating portion shown in FIG. 14.

FIG. 15 illustrates an internal block diagram of the specified magnetic flux calculating portion 26. The specified magnetic flux calculating portion 26 shown in FIG. 15 includes individual portions denoted by reference numerals 35 to 37. The specified magnetic flux calculating portion 26 calculates and delivers an $\alpha$-axis specified magnetic flux value $\phi_\alpha^*$ and a $\beta$-axis specified magnetic flux value $\phi_\beta^*$ that are target values of $\phi_\alpha$ and $\phi_\beta$ based on $|\phi_S^*|$ obtained as described above, $\theta$s from the magnetic flux and torque estimator 23 and $\Delta T$ from the subtracter 24.

More specifically, a PI controller 35 performs proportional-plus-integral control for converging $\Delta T$ to zero so as to calculate a phase correction quantity $\Delta\theta_S^*$ corresponding to $\Delta T$. An adder 36 calculates a sum ($\theta_S + \Delta\theta_S^*$) of $\theta_S$ and $\Delta\theta_S^*$. This sum is supplied to a vector generating portion 37 as a phase specified value $\theta_S^*$ (i.e., ($\theta_S + \Delta\theta_S^*$)). The vector generating portion 37 calculates $\phi_\alpha^*$ and $\phi_\beta^*$ based on $|\phi_S^*|$ and $\theta_S^*$ in accordance with the equations (2-9a) and (2-9b) below.

$$\phi_\alpha^* = |\phi_S^*|\cos\theta_S^* \quad (2\text{-}9a)$$

$$\phi_\beta^* = |\phi_S^*|\sin\theta_S^* \quad (2\text{-}9b)$$

The values $\phi_\alpha^*$ and $\phi_\beta^*$ calculated by the specified magnetic flux calculating portion 26 and the values $\phi_\alpha$ and $\phi_\beta$ estimated by the magnetic flux and torque estimator 23 are supplied to the subtracters 27 and 28. The subtracters 27 and 28 calculates deviations ($\phi_\alpha^* - \phi_\alpha$) and ($\phi_\beta^* - \phi_\beta$) and supplies them to the specified voltage calculating portion 29. In addition, $i_\alpha$ and $i_\beta$ obtained by the coordinate converter 22 are also supplied to the specified voltage calculating portion 29 (omitted in FIG. 14).

Figure 16:
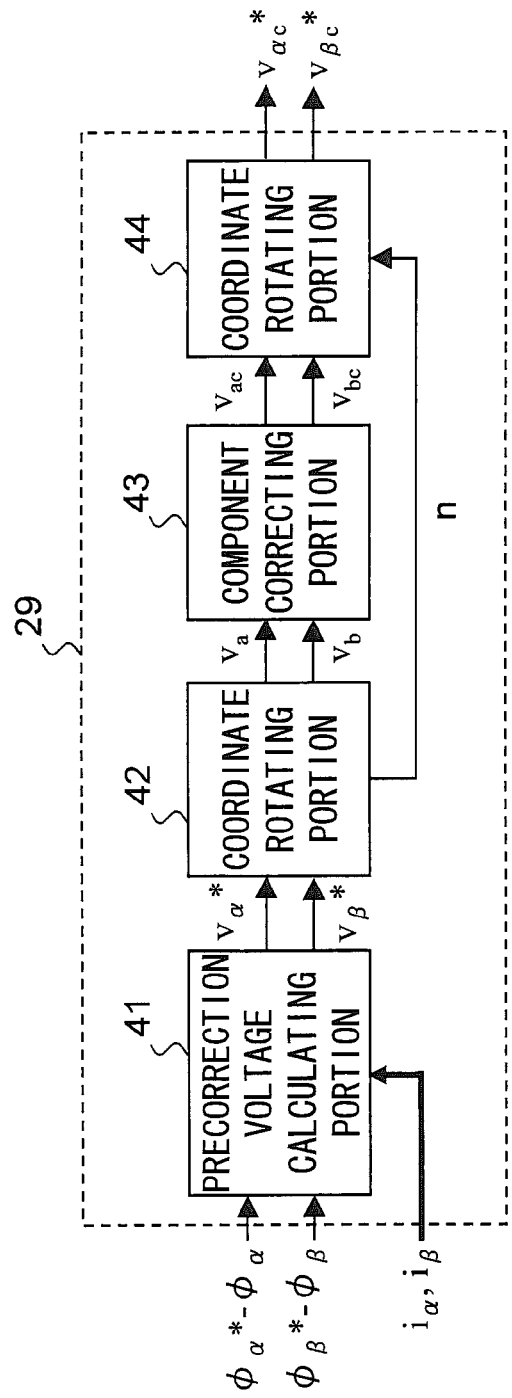
FIG. 16 is an internal block diagram of a specified voltage calculating portion shown in FIG. 14.

FIG. 16 illustrates an internal block diagram of the specified voltage calculating portion 29. The specified voltage calculating portion 29 shown in FIG. 16 includes individual portions denoted by reference numerals 41 to 44. A precorrection voltage calculating portion 41 calculates an $\alpha$-axis specified voltage value $v_\alpha^*$ and a $\beta$-axis specified voltage value $v_\beta^*$ based on ($\phi_\alpha^* - \phi_\alpha$), ($\phi_\beta^* - \phi_\beta$) $i_\alpha$ and $i_\beta$ so that $\phi_\alpha$ tracks $\phi_\alpha^*$ and that $\phi_\beta$ tracks $\phi_\beta^*$. The symbols $v_\alpha^*$ and $v_\beta^*$ represent respectively target values of $v_\alpha$ and $v_\beta$ for converging both ($\phi_\alpha^* - \phi_\alpha$) and ($\phi_\beta^* - \phi_\beta$) to zero. The values $v_\alpha^*$ and $v_\beta^*$ are calculated so that a specified voltage vector ($v_{\alpha\beta}^*$) made up of $v_\alpha^*$ and $v_\beta^*$ becomes a sum of a time differential of a magnetic flux linkage vector ($\phi_{\alpha\beta}$) made up of $\phi_\alpha$ and $\phi_\beta$ and a voltage drop vector due to $R_a$ and a current vector ($i_{\alpha\beta}$) made up of $i_\alpha$ and $i_\beta$ (see the equation (2-10) below). When the individual values generated in the motor driving system are regarded as discrete values, this calculation method can be embodied. The embodied calculation method will be described later.

$$v_{\alpha\beta}^* = \frac{d\phi_{\alpha\beta}}{dt} + R_a \cdot i_{\alpha\beta} \quad (2\text{-}10)$$

A coordinate rotating portion 42 converts $v_\alpha^*$ and $v_\beta^*$ into $v_a$ and $v_b$ in accordance with the above equation (1-2). More specifically, it converts two-phase specified voltage vector represented by $v_\alpha^*$ and $v_\beta^*$ on the $\alpha\beta$ coordinates into two-phase specified voltage vector represented by $v_a$ and $v_b$ on the ab coordinates (the specified voltage vectors correspond to the voltage vector 110 shown in FIG. 8). In addition, a value of n that is used for calculation of the equation (1-2) is calculated by using the above equation (1-1a) or (1-1b). A value of n calculated by the coordinate rotating portion 42 is used also for calculation in the coordinate rotating portion 44. Note that the coordinate rotating portion 42 uses $v_\alpha^*$ and $v_\beta^*$ as $v_\alpha$ and $v_\beta$, respectively, in the right-hand sides of the equation (1-1a), (1-1b) and (1-2).

A component correcting portion 43 performs the correction process in the step S2 of FIG. 10 on $v_a$ and $v_b$, so as to output $v_a$ and $v_b$ after the correction as $v_{ac}$ and $v_{bc}$, respectively. However, if the correction is not necessary, "$v_{ac}=v_a$" and "$v_{bc}=v_b$" hold.

The coordinate rotating portion 44 converts the a-axis voltage $v_{ac}$ and the b-axis voltage $v_{bc}$ after the correction into the α-axis voltage $v_{\alpha c}$ and the β-axis voltage $v_\beta c$ after the correction in accordance with the above equation (1-5), so as to output the obtained $v_{\alpha c}$ and $v_{\beta c}$ as $v_{\alpha c}^*$ and $v_{\beta c}^*$, respectively. In other words, it converts the two-phase specified voltage vector expressed by $v_{ac}$ and $v_{bc}$ on the ab coordinates after the correction into the two-phase specified voltage vector expressed by $v_{\alpha c}^*$ and $v_{\beta c}^*$ on the αβ coordinates after the correction. The symbols $v_{\alpha c}^*$ and $v_{\beta c}^*$ represent respectively the α-axis component and the β-axis component of the specified voltage vector after the correction.

The specified voltage values $v_{\alpha c}^*$ and $v_{\beta c}^*$ calculate by the specified voltage calculating portion 29 (coordinate rotating portion 44) are supplied to the coordinate converter 30 shown in FIG. 14. The coordinate converter 30 converts $v_{\alpha c}^*$ and $v_{\beta c}^*$ into the specified three-phase voltage values $v_u^*$, $v_v^*$ and $v_w^*$ and outputs the specified three-phase voltage values to the inverter 2. The inverter 2 supplies three-phase AC current to the motor 1 in accordance with the specified three-phase voltage values. The values $v_u^*$, $v_v^*$ and $v_w^*$ calculated by the coordinate converter 30 correspond to the U-phase axis component, the V-phase axis component and the W-phase axis component of the specified voltage vector expressed by $v_{\alpha c}^*$ and $v_{\beta c}^*$.

[Calculation Equation with Discretization]

Calculations in the motor driving system are performed based on discrete instantaneous values of individual state quantities, actually. Therefore, it is considered that input values and output values of individual portions denoted by reference numerals 21 to 30 are made discrete values by a discrete period $T_S$, and operations of the individual portions will be further described.

It is supposed that the reference time (t=0) belongs to the 0th period, and that the present time belongs to the m-th period (m is a natural number). Then, $i_u$ and $i_v$ in the m-th period are represented by i[m] and $i_v$[m], respectively, and $i_\alpha$ and $i_\beta$ based on $i_u$[m] and $i_v$[m] are represented by $i_\alpha$[m] and $i_\beta$[m], respectively. Then, $v_{\alpha c}^*$ and $v_{\beta c}^*$ output from the specified voltage calculating portion 29 in the m-th period are represented by $v_{\alpha c}^*$[m] and $v_{\beta c}^*$[m], respectively, and $\phi_\alpha$, $\phi_\beta$, $\theta_S$ and T based on $i_\alpha$[m], $i_\beta$[m], $v_{\alpha c}^*$[m] and $v_{\beta c}^*$[m] are represented by $\phi_\alpha$[m], $\phi_\beta$[m], $\theta_S$[m] and T[m], respectively. Further, T* in the m-th period is represented by T*[m], and $|\phi_S^*|$ based on T*[m] is represented by $|\phi_S^*|$[m]. In addition, ΔT based on T*[m] and T[m] is represented by ΔT[m].

In this case, the magnetic flux and torque estimator 23 calculates $\phi_\alpha$[m], $\phi_\beta$[m], $\theta_S$[m] and T[m] in accordance with the equations (3-1) to (3-4) below, which correspond to the above equations (2-1) to (2-4).

$$\phi_\alpha[m] = \sum_{k=1}^{m}(v_{\alpha c}^*[k] - R_a i_\alpha[k])\cdot T_S + \phi_{\alpha|t=0} \quad (3\text{-}1)$$

$$\phi_\beta[m] = \sum_{k=1}^{m}(v_{\beta c}^*[k] - R_a i_\beta[k])\cdot T_S + \phi_{\beta|t=0} \quad (3\text{-}2)$$

$$\theta_S[m] = \tan^{-1}(\phi_\beta[m]/\phi_\alpha[m]) \quad (3\text{-}3)$$

$$T[m] = P_N(\phi_\alpha[m]i_\beta[m] - \phi_\beta[m]i_\alpha[m]) \quad (3\text{-}4)$$

Then, the specified magnetic flux calculating portion 26 calculates $\phi_\alpha^*$[m+1] and $\phi_\alpha^*$[m+1] based on ΔT[m], $\theta_S$[m] and $|\phi_S^*|$[m], and the subtracters 27 and 28 calculate the deviations ($\phi_\alpha^*$[m+1]−$\phi_\alpha$[m]) and ($\phi_{62}$*[m+1]−$\phi_\beta$[m]). In other words, target values of $\phi_\alpha$ and $\phi_\beta$ of the next period are determined based on ΔT, $\theta_S$ and $|\phi_S^*|$ in the m-th period, and a deviation between the target value and an instantaneous value of the magnetic flux linkage at the present time is determined.

The precorrection voltage calculating portion 41 (see FIG. 16) in the specified voltage calculating portion 29 calculates the specified voltage vector necessary for matching the $\phi_\alpha$ and $\phi_\beta$ in the (m+1)th period with $\phi_\alpha^*$[m+1] and $\phi_\beta^*$[m+1]. In other words, the precorrection voltage calculating portion 41 calculates $v_\alpha^*$[m+1] and $v_\beta^*$[m+1] in accordance with the equation (3-5) below, which corresponds to the above equation (2-10). After that, the specified voltage calculating portion 29 calculates $v_{\alpha c}^*$[m+1] and $v_{\beta c}^*$[m+1] indicating voltage to be applied to the motor 1 in the (m+1)th period from $v_\alpha^*$[m+1] and $v_\beta^*$[m+1] through the correction process and supplies them to the inverter 2 through the coordinate conversion performed by the coordinate converter 30.

$$\begin{bmatrix} v_\alpha^*[m+1] \\ v_\beta^*[m+1] \end{bmatrix} = \frac{1}{T_S}\begin{bmatrix} \phi_\alpha^*[m+1]-\phi_\alpha[m] \\ \phi_\beta^*[m+1]-\phi_\alpha[m] \end{bmatrix} + R_a\begin{bmatrix} i_\alpha[m] \\ i_\beta[m] \end{bmatrix} \quad (3\text{-}5)$$

Figure 17:
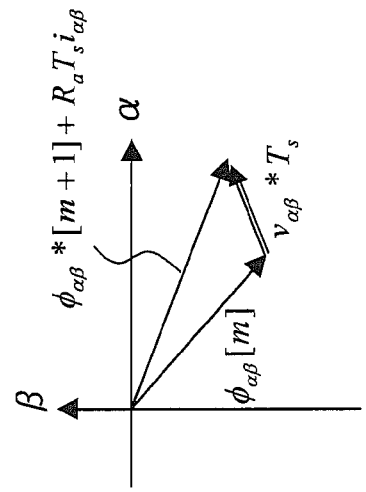
FIG. 17 is a vector diagram showing a relationship between the magnetic flux linkage and the voltage concerned with the calculation in the specified voltage calculating portion shown in FIG. 14.

The equation (3-5) (as well as the above equation (2-10)) is derived from a difference equation indicating a relationship between the magnetic flux linkage and the voltage corresponding to FIG. 17. In FIG. 17, $\phi_{\alpha\beta}$[m] represents a vector made up of $\phi_\alpha$[m] and $\phi_\beta$[m], and $\phi_{\alpha\beta}^*$[m+1] represents a vector made up of $\phi_\alpha^*$[m+1] and $\phi_\beta^*$[m+1].

In this way, the first example enables to detect the motor current with reliability by the step of correcting the voltage vector (specified voltage vector). Furthermore, since this correction process is performed on the ab coordinates that can support a easy correction, a necessary correction can be realized simply and securely. Since it is sufficient to correct the coordinate axis components $v_a$ and $v_b$ of the voltage vector (specified voltage vector) independently on the ab coordinates, contents of the correction can be simple. In particular, the correction is required for all the three phases if the applied voltage is low, but it is easy to determine correction quantities in this case.

In addition, it is possible to reduce a torque ripple by the direct torque control even if the motor that is used has harmonics in the magnetic flux of the permanent magnet or the inductance distribution. Note that it is possible to use a synchronous reluctance motor or a induction motor as the motor 1 instead of the interior permanent magnet motor. The synchronous reluctance motor and the induction motor also have harmonics in the magnetic flux of the permanent magnet or the inductance distribution, so the effect of reducing the torque ripple can be obtained by the direct torque control.

In the first example, the specified voltage values are corrected for detecting the motor current with reliability. If the specified voltage values before the correction are used for estimation of the magnetic flux, an estimation error may occur. In the first example, the specified voltage values ($v_{\alpha c}^*$ and $v_{\beta c}^*$) after the correction are used for estimating the magnetic flux, so the estimation error due to the correction does not occur. In addition, since the correction process is performed on the stage of the voltage vector, the specified voltage vector after the correction to be used for estimating the magnetic flux can be obtained easily. Therefore, the step of inverse conversion of the three-phase voltage is not necessary, and the voltage detector for detecting the three-phase voltage is not necessary unlike the motor driving system shown in FIG. 25.

SECOND EXAMPLE

Figure 18:
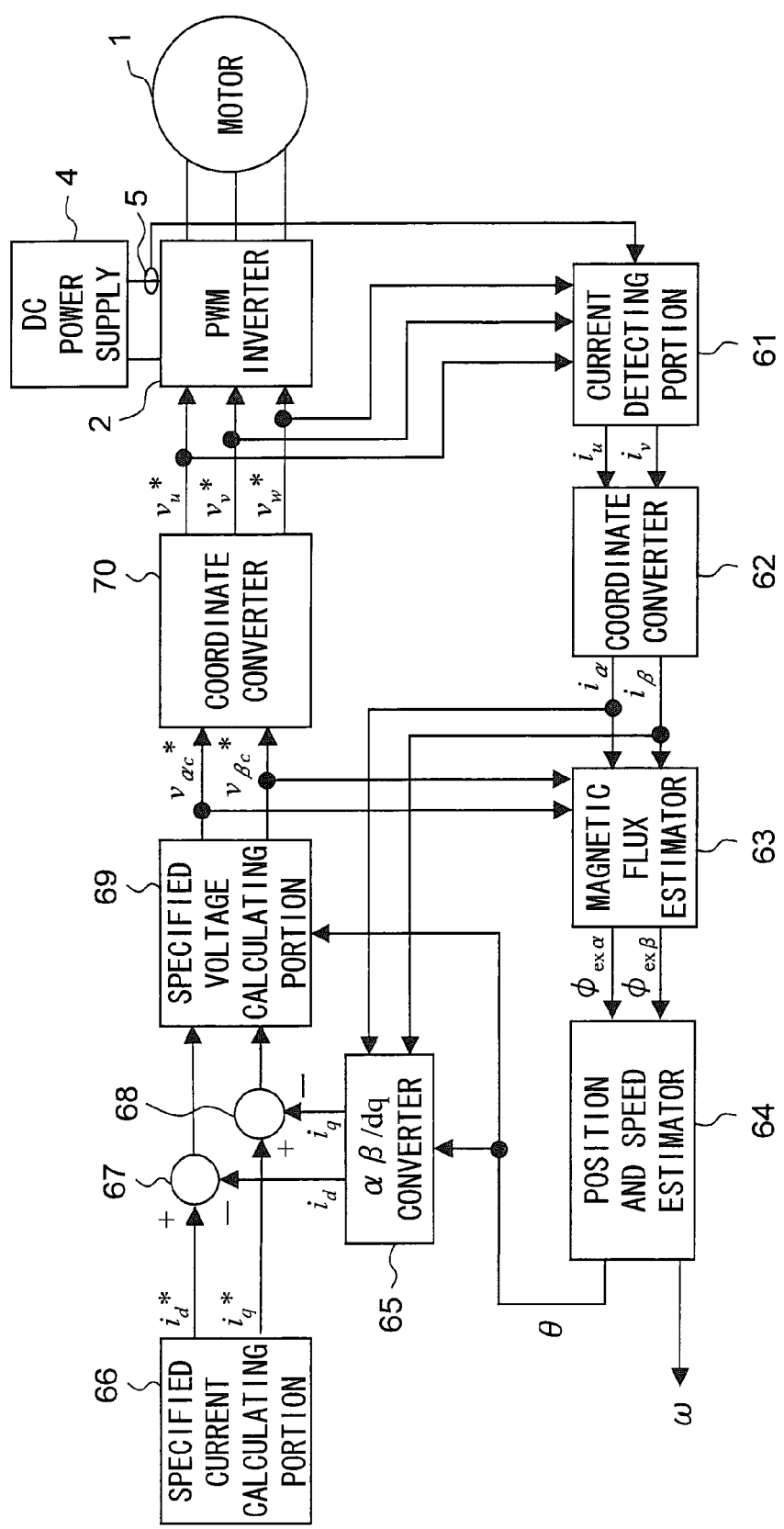
FIG. 18 is a block diagram illustrating a structure of a motor driving system according to a second example of the present invention.

Next, a second example will be described. The symbols and the like defined in the first example are also used in the second example. FIG. 18 is a block diagram showing a structure of the motor driving system according to the second example. In the motor driving system shown in FIG. 18, the vector control is performed by estimating a rotor position from an estimated value of the magnetic flux linkage.

Figure 19:
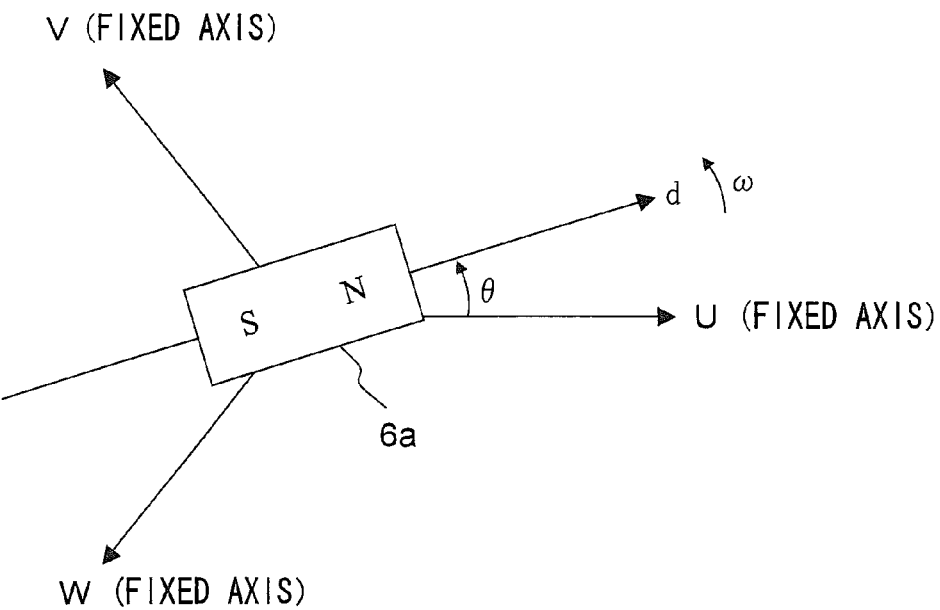
FIG. 19 is a diagram illustrating a relationship among the U-phase axis, the V-phase axis, the W-phase axis and the d-axis.

Prior to description of individual portions shown in FIG. 18, axes defined in the second example will be described, and calculation equations concerned with operations in the second example will be derived. FIG. 19 is referred to. FIG. 19 is an analytic model diagram of the motor 1. FIG. 19 shows the U-phase axis, the V-phase axis and the W-phase axis. Numeral 6a denotes a permanent magnet provided to the rotor 6 of the motor 1. In the rotating coordinate system rotating at the same speed as the magnetic flux of the permanent magnet 6a, the direction of the magnetic flux of the permanent magnet 6a is regarded as the d-axis. In addition, it is supposed that the q-axis is at the phase leading the d-axis by 90 degrees of electrical angle, though it is not illustrated. The d-axis and the q-axis are coordinate axes of the rotating coordinate system, and the coordinates (coordinate system) having them as its coordinate axes is referred to as the dq coordinates (dq coordinate system).

The d-axis (as well as the q-axis) is rotating, and its rotation speed (electrical angle speed) is represented by $\omega$. In addition, a phase of the d-axis in the counterclockwise direction viewed from the armature winding fixed-axis of the U-phase is represented by $\theta$. The counterclockwise direction corresponds to the phase leading direction. Since the phase $\theta$ is usually called a rotor position, it is referred to as the rotor position in the following description.

A d-axis component and a q-axis component of the entire motor voltage $V_a$ applied to the motor 1 from the inverter 2 are referred to as a d-axis voltage $v_d$ and a q-axis voltage $V_q$, respectively. In addition, as described above in the first example, the d-axis component and the q-axis component of the entire motor current $I_a$ supplied from the inverter 2 to the motor 1 are referred to as a d-axis current $i_d$ and a q-axis current $i_q$.

Specified values with respect to the d-axis voltage $v_d$ and the q-axis voltage $v_q$ are referred to as a d-axis specified voltage value $v_d^*$ and a q-axis specified voltage value $v_q^*$, respectively. The specified values $v_d^*$ and $v_q^*$ are voltage values (target voltage values) to which $v_d$ and $v_q$ should follow, respectively.

The specified value with respect to the d-axis current $i_d$ and the q-axis current $i_q$ are referred to as a d-axis specified current value $i_d^*$ and a q-axis specified current value $i_q^*$, respectively. The specified values $i_d^*$ and $i_q^*$ are current values (target current values) to which $i_d$ and $i_q$ should follow, respectively.

An extended induction voltage equation (in other words, an extended electromotive force equation) on the dq coordinates is expressed by the equation (4-1), and an extended induction voltage (in other words, an extended electromotive force) $E_{ex}$ is expressed by the equation (4-2). Note that "p" in the equations below is a differential operator. When the equation (4-1) is rewritten with respect to the $\alpha\beta$ coordinates, the equation (4-3) is obtained. Furthermore, the fact that the equation (4-3) holds is also described in the document "Sensorless Controls of Salient-Pole Permanent Magnet Synchronous Motors Using Extended Electromotive Force Models" by Ichikawa and four others, Institute of Electrical Engineers Papers D, 2002, Vol. 122, No. 12, pp. 1088-1096.

$$\begin{bmatrix} v_d \\ v_q \end{bmatrix} = \begin{bmatrix} R_a + pL_d & -\omega L_q \\ \omega L_q & R_a + pL_d \end{bmatrix} \begin{bmatrix} i_d \\ i_q \end{bmatrix} + \begin{bmatrix} 0 \\ E_{ex} \end{bmatrix} \qquad (4\text{-}1)$$

$$E_{ex} = \omega((L_d - L_q)i_d + \Phi_a) - (L_d - L_q)(pi_q) \qquad (4\text{-}2)$$

$$\begin{bmatrix} v_\alpha \\ v_\beta \end{bmatrix} = \begin{bmatrix} R_a + pL_d & \omega(L_d - L_q) \\ -\omega(L_d - L_q) & R_a + pL_d \end{bmatrix} \begin{bmatrix} i_\alpha \\ i_\beta \end{bmatrix} + E_{ex} \begin{bmatrix} -\sin\theta \\ \cos\theta \end{bmatrix} \qquad (4\text{-}3)$$

The matrix in the first term of the right-hand side of the equation (4-3) is moved to the left-hand side of the same, and then each side is integrated with respect to time. Thus, the equations (4-4) and (4-5) are obtained (since "$\theta=\omega t$" holds, the integral of $-\sin\theta$ is $\cos\theta/\omega$ while the integral of $\cos\theta$ is $\sin\theta/\omega$). On this occasion, however, the differential term of $i_q$ of the extended induction voltage $E_{ex}$ (i.e., the second term of the right-hand side of the equation (4-2)) is omitted.

$$\int (v_\alpha - R_a i_\alpha - \omega(L_d - L_q)i_\beta)dt - L_d i_\alpha = ((L_d - L_q)i_d + \Phi_a)\cos\theta = \phi_{ex\alpha} \qquad (4\text{-}4)$$

$$\int (v_\beta + \omega(L_d - L_q)i_\alpha - R_a i_\beta)dt - L_d i_\beta = ((L_d - L_q)i_d + \Phi_a)\sin\theta = \phi_{ex\beta} \qquad (4\text{-}5)$$

Supposing "$E_{ex}=\phi_{ex}/\omega$" holds, $E_{ex}$ represents an induction voltage (electromotive force) generated by magnetic flux linkage $\phi_{ex}$ of the armature winding and rotation of the rotor 6 of the motor 1. If $E_{ex}$ is regarded as an induction voltage vector in the rotating coordinate system, the induction voltage vector becomes a vector on the q-axis. Similarly, if $\phi_{ex}$ is regarded as a magnetic flux linkage vector in the rotating coordinate system, the magnetic flux linkage vector becomes a vector on the d-axis. Symbols $\phi_{ex\alpha}$ and $\phi_{ex\beta}$ appearing also in the equations (4-4) and (4-5) represent respectively an $\alpha$-axis component and a $\beta$-axis component of $\phi_{ex}$.

A phase $\theta_{ex}$ of the magnetic flux linkage vector $\phi_{ex}$ with respect to the $\alpha$-axis is expressed by the equation (4-6) below. In the motor driving system according to the second example, the $\alpha$-axis component $\phi_{ex\alpha}$ and the $\beta$-axis component $\phi_{ex\beta}$ of the magnetic flux linkage vector $\phi_{ex}$ are estimated, and base on the estimated values the phase $\theta_{ex}$ is estimated. As described above, since the magnetic flux linkage vector $\phi_{ex}$ is to be a vector on the d-axis, the estimated $\theta_{ex}$ is identical to $\theta$ ideally. Therefore, PLL (Phase Locked Loop) control is performed based on a difference (axial error) between the estimated $\theta_{ex}$ and $\theta$ to be used for the coordinate conversion, so that the rotation speed and the rotor position are estimated. The rotation speed $\omega$ and the rotor position $\theta$ are estimated in accordance with the equations (4-7) and (4-8) below. Here, $K_p$ and $K_i$ respectively represent a proportional coefficient and an integral coefficient in the proportional-plus-integral control, and s is the Laplace operator.

$$\theta_{ex} = \tan^{-1}(\phi_{ex\beta}/\phi_{ex\alpha}) \quad (4\text{-}6)$$

$$\omega = (K_p + K_i/s)(\theta_{ex} - \theta) \quad (4\text{-}7)$$

$$\theta = \omega/s \quad (4\text{-}8)$$

A concrete operation of the motor driving system shown in FIG. 18 will be described. The motor control system shown in FIG. 18 includes a motor 1, an inverter 2, a DC power supply 4, a current sensor 5, and individual portions denoted by reference numerals 61-70. In the second example, the controller 3 shown in FIG. 1 is made up of the individual portions denoted by the reference numerals 61-70.

As described above, the current sensor 5 senses bus current and outputs a signal indicating a current value of the bus current. A current detecting portion 61 and a coordinate converter 62 are similar respectively to the current detecting portion 21 and the coordinate converter 22 shown in FIG. 14. More specifically, the current detecting portion 61 calculates and outputs the U-phase current $i_u$ and the V-phase current $i_v$ based on the output signal value of the current sensor 5 and the specified three-phase voltage values $v_u^*$, $v_v^*$ and $v_w^*$ similarly to the current detecting portion 21 shown in FIG. 14. However, the specified three-phase voltage values $v_u^*$, $v_v^*$ and $v_w^*$ with respect to the current detecting portion 61 are supplied from the coordinate converter 70. The coordinate converter 62 converts $i_u$ and $i_v$ calculated in the current detecting portion 61 into $i_\alpha$ and $i_\beta$.

A magnetic flux estimator 63 estimates the magnetic flux linkage of the motor 1 based on $i_\alpha$ and $i_\beta$ obtained by the coordinate converter 62 and $v_{\alpha c}^*$ and $v_{\beta c}^*$ from the specified voltage calculating portion 69 in accordance with the above equations (4-4) and (4-5) (in other words, it calculates the α-axis component $\phi_{ex\alpha}$ and the β-axis component $\phi_{ex\beta}$ of the magnetic flux linkage vector $\phi_{ex}$). On this occasion, $v_{\alpha c}^*$ and $v_{\beta c}^*$ are used respectively as $v_\alpha$ and $v_\beta$ in the equations (4-4) and (4-5). In addition, ω estimated by the position and speed estimator 64 is also used.

Figure 20:
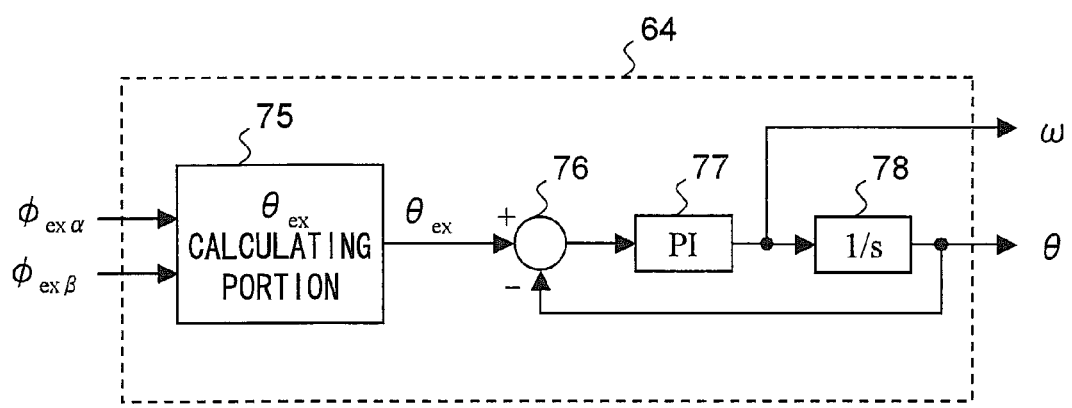
FIG. 20 is an internal block diagram of a position and speed estimator shown in FIG. 18.

FIG. 20 illustrates an internal block diagram of the position and speed estimator 64. The position and speed estimator 64 shown in FIG. 20 includes individual portions denoted by reference numerals 75 to 78. A $\theta_{ex}$ calculating portion 75 calculates the phase $\theta_{ex}$ based on the $\phi_{ex\alpha}$ and $\phi_{ex\beta}$ calculated by the magnetic flux estimator 63 in accordance with the above equation (4-6). A subtracter 76 subtracts θ supplied by an integrator 78 from $\theta_{ex}$ supplied by the $\theta_{ex}$ calculating portion 75 so as to calculate an axial error ($\theta_{ex} - \theta$). A PI controller 77 performs proportional-plus-integral control so that the axial error ($\theta_{ex} - \theta$) converges to zero. In other words, the calculation is performed in accordance with the above equation (4-7), so that the rotation speed ω is calculated. The integrator 78 integrates ω calculated by the PI controller 77 in accordance with the above equation (4-8), so as to calculate the rotor position θ. The values ω and θ calculated by the PI controller 77 and the integrator 78 are the rotation speed and the rotor position estimated by the position and speed estimator 64.

A (αβ/dq) converter 65 converts $i_\alpha$ and $i_\beta$ obtained by the coordinate converter 62 into $i_d$ and $i_q$ that are current components on the dq coordinates in accordance with θ estimated by the position and speed estimator 64.

A specified current calculating portion 66 generates and delivers the d-axis specified current value $i_d^*$ and the q-axis specified current value $i_q^*$. For instance, it generates $i_q^*$ so that the rotation speed ω follows a speed specified value ω* supplied from the outside and refers to $i_q^*$ and the like, if necessary, so as to generate $i_d^*$ so that a desired vector control (e.g., maximum torque control) can be realized.

Subtracters 67 and 68 calculates current errors ($i_d^* - i_d$) and ($i_q^* - i_q$) based on $i_d$ and $i_q$ from the (αβ/dq) converter 65 and $i_d^*$ and $i_q^*$ from the specified current calculating portion 66, and a result of the calculation is supplied to the specified voltage calculating portion 69.

Figure 21:
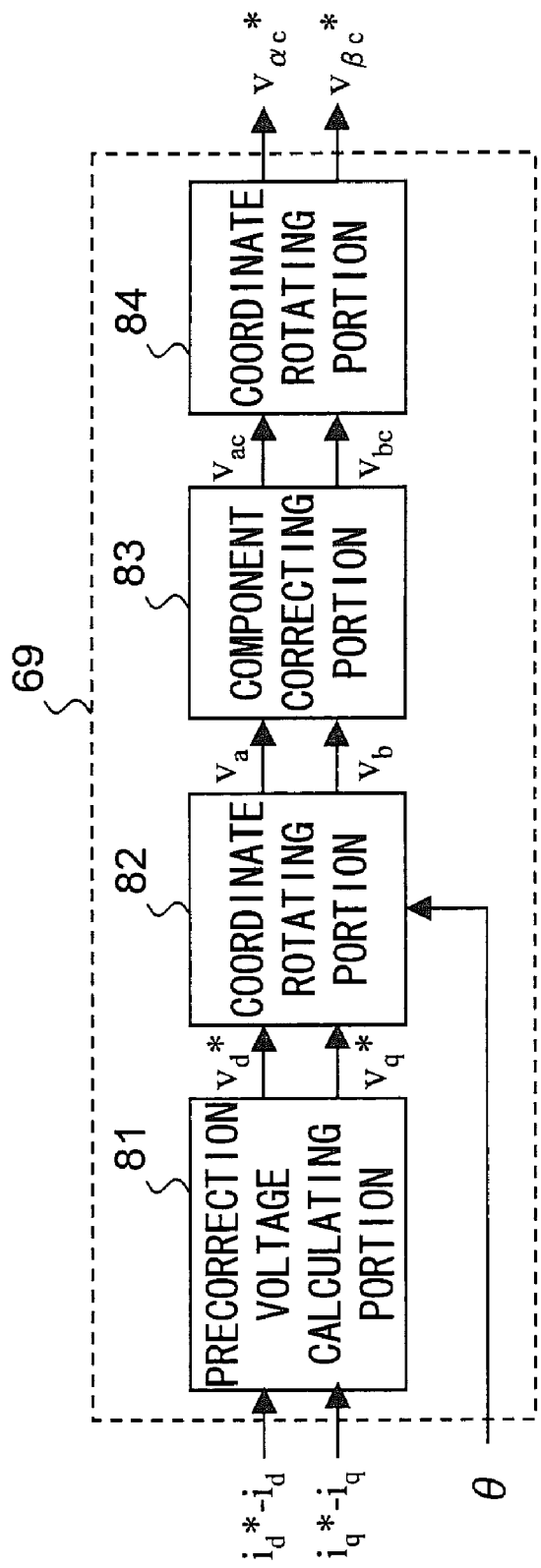
FIG. 21 is an internal block diagram of a specified voltage calculating portion shown in FIG. 18.

FIG. 21 illustrates an internal block diagram of the specified voltage calculating portion 69. The specified voltage calculating portion 69 shown in FIG. 21 includes individual portions denoted by reference numerals 81 to 84. A precorrection voltage calculating portion 81 calculates the d-axis specified voltage value $v_d^*$ and the q-axis specified voltage value $v_q^*$ so that the current errors ($i_d^* - i_d$) and ($i_q^* - i_q$) converge to zero by the proportional-plus-integral control. The values $v_d^*$ and $v_q^*$ are target values of $v_d$ and $v_q$ for converging both of ($i_d^* - i_d$) and ($i_q^* - i_q$) to zero.

Figure 22:
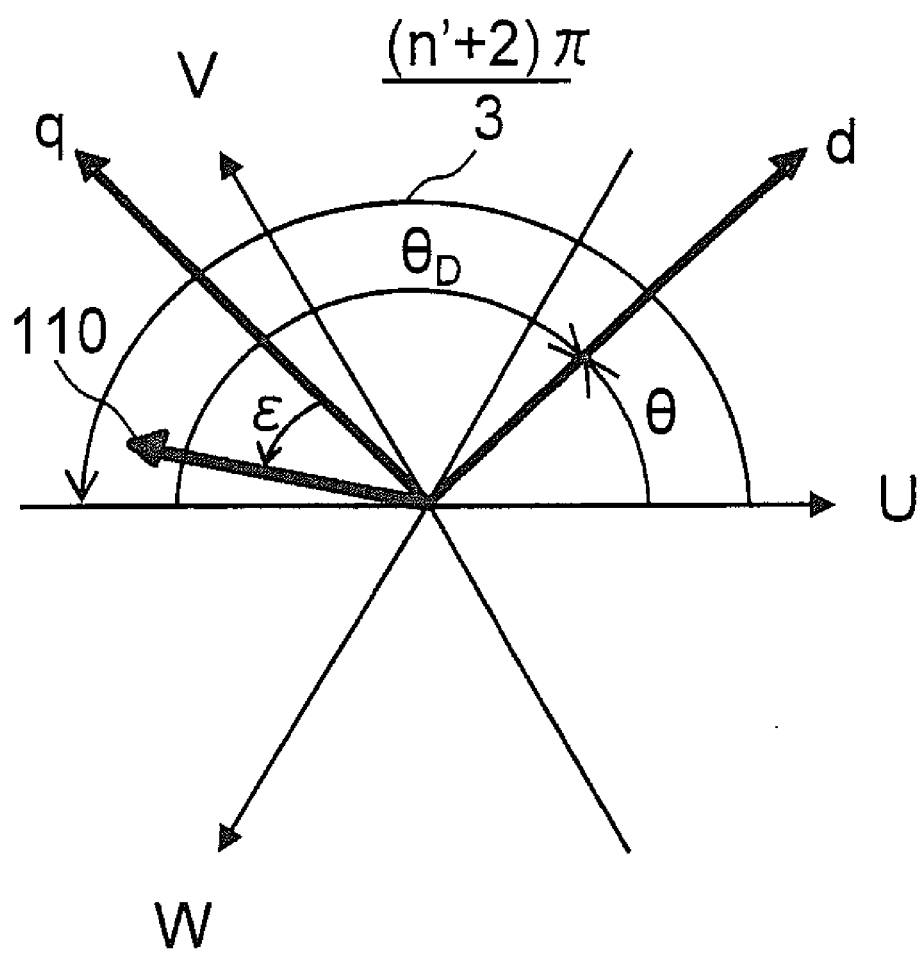
FIG. 22 is a diagram illustrating a rotor phase (θ) decomposed by considering a relationship with the a-axis shown in FIG. 9.
Figure 23:
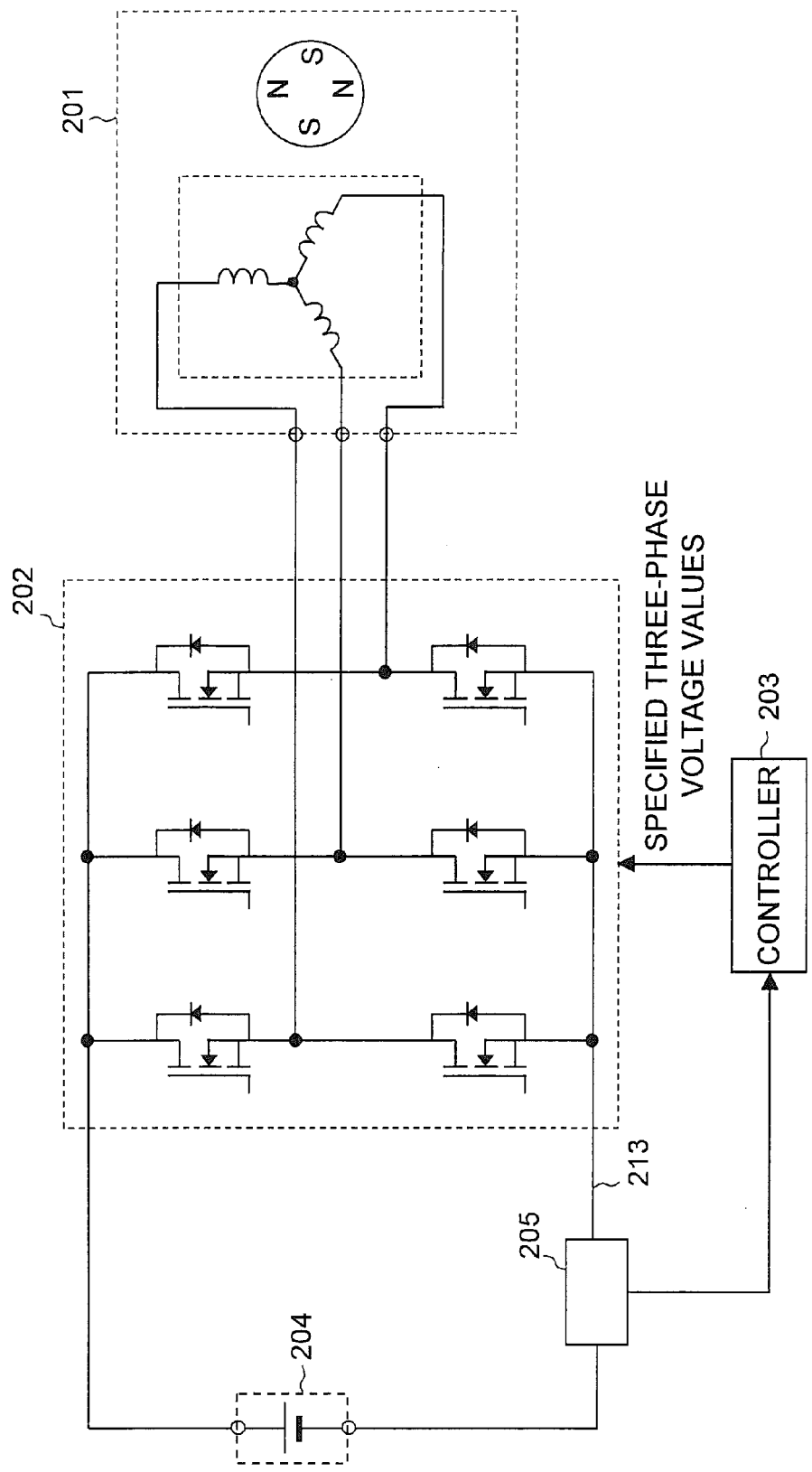
FIG. 23 is a block diagram illustrating a general structure of a conventional motor driving system adopting the single shunt current detecting method.
Figure 24:
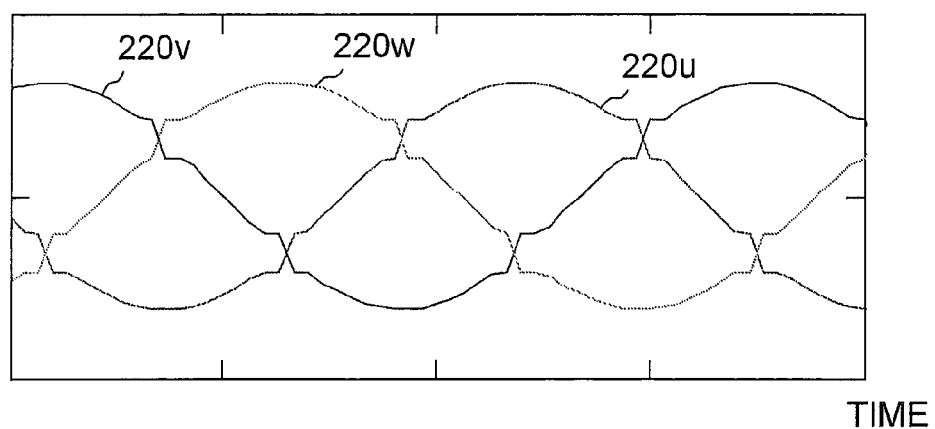
FIG. 24 is a diagram illustrating a correction example of the specified voltage value (pulse width) in the conventional case where the single shunt current detecting method is adopted.

A coordinate rotating portion 82 converts $v_d^*$ and $v_q^*$ into $v_a$ and $v_b$ based on θ estimated by the position and speed estimator 64. Referring to FIG. 22, this conversion method will be further described. FIG. 22 is a space vector diagram showing a relationship among the U-phase axis, the V-phase axis, the W-phase axis, the d-axis, the q-axis and the voltage vector 110. A phase of the voltage vector 110 viewed from the q-axis is represented by ε. A phase of the voltage vector 110 with respect to the U-phase axis is expressed by (θ+ε+π/2). In addition, a phase of the axis closest to the voltage vector 110 among axes $a_1$ to $a_6$ (see FIG. 9) is expressed by "(n'+2)π/3" with respect to the U-phase axis. Here, n' represents a quotient obtained by dividing (θ+ε) by π/3.

For convenience sake, θ is decomposed into the above-mentioned phase (n'+2)π/3 and a difference phase $\theta_D$ between the phase (n'+2)π/3 and θ as shown in FIG. 22. A relationship between these phases is expressed by the equation (5-1) below. Then, $v_d$ and $v_q$ expressing the voltage components on the dq coordinates are converted into $v_a$ and $v_b$ expressing the voltage components on the ab coordinates by the equation (5-2) below. In addition, ε is expressed by the equation (5-3) below.

$$\theta = \theta_D + \frac{(n'+2)\pi}{3} \quad (5\text{-}1)$$

$$\begin{pmatrix} v_a \\ v_b \end{pmatrix} = \begin{bmatrix} \cos\theta_D & -\sin\theta_D \\ \sin\theta_D & \cos\theta_D \end{bmatrix} \begin{pmatrix} v_d \\ v_q \end{pmatrix} \quad (5\text{-}2)$$

$$\varepsilon = \tan^{-1}\left(\frac{-v_d}{v_q}\right) \quad (5\text{-}3)$$

The coordinate rotating portion 82 converts $v_d^*$ and $v_q^*$ into $v_a$ and $v_b$ in accordance with the above equations (5-1) to (5-3). On this occasion, however, $v_d^*$ and $v_q^*$ are used respectively as $v_d$ and $v_q$ in the equations (5-2) and (5-3). More specifically, n' is determined from ε obtained from the equation (5-3) and the estimated θ, and then θ and the determined n' are substituted into the equation (5-1) so as determine $\theta_D$. After that, using the determined $\theta_D$, $v_d^*$ and $v_q^*$ is converted into $v_a$ and $v_b$ in accordance with the equation (5-2). The equation "n'+2=n" holds between n' and n described in the first example (see FIG. 8). The value obtained by adding 2 to n' determined in the coordinate rotating portion 82 (i.e., the value of n) is used for calculation in a coordinate rotating portion 84.

The values $v_a$ and $v_b$ obtained in the coordinate rotating portion 82 are sent to a component correcting portion 83. The component correcting portion 83 and the coordinate rotating portion 84 are similar to the component correcting portion 43 and the coordinate rotating portion 44 shown in FIG. 16. More specifically, the component correcting portion 83 performs the correction process in the step S2 in FIG. 10 on $v_a$ and $v_b$, and it delivers $v_a$ and $v_b$ after the correction as $v_{ac}$ and $v_{bc}$, respectively. If the correction is not necessary, however, "$v_{ac}=v_a$" and "$v_{bc}=v_b$" hold.

The coordinate rotating portion 84 converts the a-axis voltage $v_{ac}$ and the b-axis voltage $v_{bc}$ after the correction into the α-axis voltage $v_{\alpha c}$ and the β-axis voltage $v_{\beta c}$ after the correction in accordance with the above equation (1-5), so as to deliver the obtained $v_{\alpha c}$ and $v_{\beta c}$ as $v_{\alpha c}{}^*$ and $v_{\beta c}{}^*$, respectively.

The values $v_{\alpha c}{}^*$ and $v_{\beta c}{}^*$ calculate by the specified voltage calculating portion 69 (the coordinate rotating portion 84) are supplied to the coordinate converter 70 shown in FIG. 18. The coordinate converter 70 converts $V_{\alpha c}{}^*$ and $v_{\beta c}{}^*$ into the specified three-phase voltage values $v_u{}^*$, $v_v{}^*$ and $v_w{}^*$ and delivers the specified three-phase voltage values to the inverter 2. The inverter 2 supplies three-phase AC current to the motor 1 in accordance with the specified three-phase voltage values.

In the second example too, the step of correcting the voltage vector (specified voltage vector) is provided, so the motor current can be detected with reliability. Since the correction process is performed on the ab coordinates that can support a easy correction, a necessary correction can be realized simply and securely. Since it is sufficient to correct the coordinate axis components $v_a$ and $v_b$ of the voltage vector (specified voltage vector) independently on the ab coordinates, contents of the correction can be simple. In particular, the correction is required for all the three phases if the applied voltage is low, but it is easy to determine correction quantities in this case.

In the second example, the specified voltage values are corrected for detecting the motor current with reliability. If the specified voltage values before the correction are used for estimation of the magnetic flux, an estimation error may occur. In the second example, the specified voltage values ($v_{\alpha c}{}^*$ and $v_{\beta c}{}^*$) after the correction are used for estimating the magnetic flux, so the estimation error due to the correction does not occur. In addition, since the correction process is performed on the stage of the voltage vector, the specified voltage vector after the correction to be used for estimating the magnetic flux can be obtained easily. Therefore, the step of inverse conversion of the three-phase voltage is not necessary, and the voltage detector for detecting the three-phase voltage is not necessary unlike the motor driving system shown in FIG. 25.

Although the examples of the motor driving system to which the present invention is applied are described above, the present invention can include various variations (or other examples). Note 1 to Note 5 will be described below as the variations (or other examples) or annotations. The contents of the individual notes can be combined arbitrarily as long as no contradiction arises.

Note 1: Although the case where the inverter 2 uses a three-phase modulation is handled in the above description, the present invention does not depend on the modulation method. For instance, if the inverter 2 performs a two-phase modulation, the energizing pattern is different from that of the three-phase modulation shown in FIG. 3. In the two-phase modulation, since the lower arm having the minimum phase is always turned on, the energizing pattern corresponding to the period between the timings T0 and T1 and the period between the timings T6 and T7 shown in FIG. 4 does not exist. After all, however, if the bus current is detected in the energizing pattern corresponding to the period between the timings T1 and T2 and the period between the timings T2 and T3, current in the maximum phase and the minimum phase can be detected.

Note 2: In the motor driving system according to the present embodiment, the method for obtaining each of the values including the above-mentioned various specified values ($\phi_\alpha{}^*$, $v_d{}^*$ and the like) and other state quantities ($\phi_\alpha$, $\phi_{ex\alpha}$ and the like) to be derived is arbitrary. For instance, they may be obtained by calculation in the controller 3 (see FIG. 1) or by looking up table data that are set in advance.

Note 3: In addition, a part or the whole of the functions of the controller 3 (see FIG. 1) may be realized by using software (a program) incorporated in a general-use microcomputer or the like. When the controller 3 is realized by using software, the block diagram showing the structure of individual portions of the controller 3 expresses a functional block diagram. Of course, it is possible to constitute the controller 3 only by hardware without using software (a program).

Note 4: For instance, it is possible to consider as described below. The controller 3 works as a motor control device. The motor control device may be considered to include the current sensor 5 shown in FIG. 1 or the like. The motor current detector for detecting the motor current based on an output signal of the current sensor 5 includes the current detecting portion 21 shown in FIG. 14 or the current detecting portion 61 shown in FIG. 18. In addition, for instance, the precorrection voltage calculating portion 41 and the coordinate rotating portion 42 shown in FIG. 16, or the precorrection voltage calculating portion 81 and the coordinate rotating portion 82 shown in FIG. 21 work as a specified voltage vector generating portion. In addition, for instance, the component correcting portion 43 shown in FIG. 16 or the component correcting portion 83 shown in FIG. 21 works as a specified voltage vector correcting portion.

Note 5: Note that only a symbol (like $i_\alpha$) is used for expressing a state quantity (state variable) or the like corresponding to the symbol in some cases for a simple description in this specification. Therefore, for example, "$i_\alpha$" and "α-axis current $i_\alpha$" indicate the same thing in this specification.

The present invention can be preferably applied to any electric equipment using a motor. In particular, the present invention can be preferably applied to a compressor of a refrigerator, an air conditioner for a vehicle, an electric car or the like.

What is claimed is:

1. A motor control device comprising:
    a motor current detector for detecting motor current flowing in a three-phase motor based on current flowing between an inverter driving the motor and a DC power supply;
    a specified voltage vector generating portion for generating a specified voltage vector indicating a voltage vector to which an applied voltage to the motor should follow based on a magnetic flux linkage of an armature winding of the motor;
    a specified voltage vector correcting portion for correcting the generated specified voltage vector; and
    a magnetic flux estimating portion for estimating the magnetic flux linkage based on the motor current and the specified voltage vector after the correction, wherein
    the motor control device controls the motor via the inverter in accordance with the specified voltage vector after the correction.

2. The motor control device according to claim 1, wherein
the specified voltage vector generated by the specified voltage vector generating portion is a specified voltage vector on a rotating coordinate,
the specified voltage vector correcting portion corrects the specified voltage vector on the rotating coordinate in the process of converting the specified voltage vector on the rotating coordinate into specified three-phase voltage values on a three-phase fixed coordinate, and
the motor control device supplies the specified three-phase voltage values corresponding to the specified voltage vector after the correction to the inverter so as to control the motor.

3. The motor control device according to claim 1, wherein the specified voltage vector generated by the specified voltage vector generating portion is a two-phase specified voltage vector on ab coordinates rotating step by step of 60 degrees of electrical angle in accordance with a phase of the specified voltage vector with respect to a predetermined fixed-axis.

4. The motor control device according to claim 3, wherein the specified voltage vector correcting portion decides whether or not the correction is necessary based on a magnitude of a coordinate axis component constituting the two-phase specified voltage vector on the ab coordinates, and if it is decided that the correction is necessary, the specified voltage vector correcting portion corrects the coordinate axis component so that the two-phase specified voltage vector on the ab coordinates is corrected.

5. The motor control device according to claim 3, further comprising a coordinate converting portion for converting the two-phase specified voltage vector on the ab coordinates after the correction performed by the specified voltage vector correcting portion into a specified voltage vector on $\alpha\beta$ coordinates having fixed $\alpha$ and $\beta$ axes as its coordinate axes, wherein
the magnetic flux estimating portion estimates the magnetic flux linkage based on the motor current and the specified voltage vector on the $\alpha\beta$ coordinates.

6. The motor control device according to claim 3, further comprising a coordinate converting portion for converting the two-phase specified voltage vector on the ab coordinates after the correction performed by the specified voltage vector correcting portion into a specified voltage vector on $\alpha\beta$ coordinates having fixed $\alpha$ and $\beta$ axes as its coordinate axes, wherein
the magnetic flux estimating portion estimates coordinate axis components of the magnetic flux linkage on the $\alpha\beta$ coordinates based on coordinate axis components of the motor current on the $\alpha\beta$ coordinates and the specified voltage vector on the $\alpha\beta$ coordinates.

7. The motor control device according to claim 1, further comprising a torque estimating portion for estimating a torque generated by the motor based on the motor current and the estimated magnetic flux linkage, wherein
the motor control device performs direct torque control of the motor based on the estimated torque.

8. The motor control device according to claim 1, further comprising a rotor position estimating portion for estimating a rotor position of the motor based on the estimated magnetic flux linkage, wherein
the motor control device performs vector control of the motor based on the estimated rotor position.

9. A motor driving system comprising:
a three-phase motor;
an inverter for driving the motor; and
the motor control device according to claim 1 for controlling the inverter so as to control the motor.

* * * * *